United States Patent
Byrne et al.

(10) Patent No.: US 8,949,500 B2
(45) Date of Patent: Feb. 3, 2015

(54) NON-BLOCKING PROCESSOR BUS BRIDGE FOR NETWORK PROCESSORS OR THE LIKE

(75) Inventors: Richard J. Byrne, Hillsborough, NJ (US); David S. Masters, Schnecksville, PA (US)

(73) Assignee: LSI Corporation, Milpitas, CA (US)

( * ) Notice: Subject to any disclaimer, the term of this patent is extended or adjusted under 35 U.S.C. 154(b) by 439 days.

(21) Appl. No.: 13/409,432

(22) Filed: Mar. 1, 2012

(65) Prior Publication Data
US 2013/0042038 A1 Feb. 14, 2013

Related U.S. Application Data

(60) Provisional application No. 61/521,275, filed on Aug. 8, 2011.

(51) Int. Cl.
  *G06F 13/36* (2006.01)
  *G06F 13/362* (2006.01)
(52) U.S. Cl.
  CPC .................................. *G06F 13/362* (2013.01)
  USPC ........... 710/311; 710/110; 710/310; 710/315; 710/306
(58) Field of Classification Search
  CPC .. G06F 13/4059; G06F 13/16; G06F 13/4027
  USPC ........ 710/60, 62, 74, 110, 305, 306; 711/104, 711/105, 150, 151, 154, 158
  See application file for complete search history.

(56) References Cited

U.S. PATENT DOCUMENTS

| | | | |
|---|---|---|---|
| 4,622,631 A | | 11/1986 | Frank et al. |
| 4,805,098 A | * | 2/1989 | Mills et al. ..................... 711/118 |
| 5,535,340 A | | 7/1996 | Bell et al. |
| 5,623,698 A | | 4/1997 | Stephenson et al. |
| 5,857,087 A | * | 1/1999 | Bemanian et al. ............ 710/305 |
| 5,892,766 A | | 4/1999 | Wicki et al. |

(Continued)

FOREIGN PATENT DOCUMENTS

JP   H02-271444   11/1999

OTHER PUBLICATIONS

Xilinx. LogiCORE IP PLBV46 to AXI Bridge (v2.00a). Product Specification. Sep. 21, 2010.*

(Continued)

*Primary Examiner* — Matthew David
(74) *Attorney, Agent, or Firm* — Daniel J. Santos; Smith Risley Tempel Santos LLC

(57) ABSTRACT

Described embodiments provide a system having a bridge for connecting two different processor buses. The bridge receives a request from a first bus, the request having an identification field having a value. The request is then entered into one of a plurality of buffers having requests therein with the same identification field values. Which buffer receives the request may be based on a variety of techniques, such as random, least recently used, most full, prioritized, or sequential. Next, the buffered request is transmitted over a second bus. A response to the request is eventually received from the second bus, the response is transmitted over the first bus, and the request is then removed from the buffer. By entering the received request to the buffer with request with the same identification value, there is a reduced possibility of head-of-line request blocking when compared to a single buffer implementation.

30 Claims, 13 Drawing Sheets

(56) References Cited

U.S. PATENT DOCUMENTS

| | | | |
|---|---|---|---|
| 5,943,283 A | 8/1999 | Wong et al. | |
| 5,949,981 A | 9/1999 | Childers | |
| 6,038,630 A | 3/2000 | Foster et al. | |
| 6,195,335 B1 | 2/2001 | Calvignac et al. | |
| 6,275,913 B1 * | 8/2001 | Jeddeloh | 711/158 |
| 6,286,074 B1 * | 9/2001 | Batchelor et al. | 710/305 |
| 6,442,655 B1 * | 8/2002 | Eberhard et al. | 711/151 |
| 6,487,643 B1 * | 11/2002 | Khare et al. | 711/150 |
| 6,557,084 B2 * | 4/2003 | Freerksen et al. | 711/147 |
| 6,567,564 B1 | 5/2003 | van der Wal | |
| 6,633,298 B2 * | 10/2003 | Ashburn et al. | 345/537 |
| 6,636,932 B1 | 10/2003 | Regev et al. | |
| 6,643,747 B2 * | 11/2003 | Hammarlund et al. | 711/151 |
| 6,842,792 B2 * | 1/2005 | Johnson et al. | 710/5 |
| 6,868,459 B1 * | 3/2005 | Stuber | 710/35 |
| 6,874,052 B1 * | 3/2005 | Delmonico | 710/305 |
| 7,089,346 B2 | 8/2006 | Cebulla et al. | |
| 7,181,556 B2 * | 2/2007 | Gwilt | 710/110 |
| 7,212,534 B2 * | 5/2007 | Kadambi et al. | 370/395.2 |
| 7,234,018 B1 | 6/2007 | Purcell et al. | |
| 7,308,526 B2 * | 12/2007 | Lakshmanamurthy et al. | 711/104 |
| 7,353,349 B2 * | 4/2008 | Sadowsky et al. | 711/158 |
| 7,461,187 B2 * | 12/2008 | Morishita et al. | 710/60 |
| 7,461,208 B1 | 12/2008 | Caprioli et al. | |
| 7,475,182 B2 * | 1/2009 | Matsuse et al. | 710/308 |
| 7,596,142 B1 | 9/2009 | MacAdam | |
| 7,650,453 B2 * | 1/2010 | Torii | 710/240 |
| 7,664,907 B1 * | 2/2010 | Hutsell et al. | 711/104 |
| 7,676,613 B2 * | 3/2010 | Bashford et al. | 710/74 |
| 7,680,966 B1 * | 3/2010 | Falik et al. | 710/45 |
| 7,778,815 B2 * | 8/2010 | Pasricha et al. | 703/22 |
| 7,822,906 B2 * | 10/2010 | Fan et al. | 710/310 |
| 7,917,676 B2 * | 3/2011 | Sullivan et al. | 710/110 |
| 7,934,046 B2 | 4/2011 | Butter et al. | |
| 7,991,928 B2 * | 8/2011 | Keller et al. | 710/52 |
| 8,006,021 B1 * | 8/2011 | Li et al. | 710/306 |
| 8,041,867 B2 * | 10/2011 | Lin | 710/110 |
| 8,065,449 B2 * | 11/2011 | Shimokawa | 710/22 |
| 8,171,186 B1 * | 5/2012 | Karguth et al. | 710/35 |
| 2002/0029214 A1 | 3/2002 | Yianilos et al. | |
| 2002/0165985 A1 | 11/2002 | Chen et al. | |
| 2002/0184643 A1 * | 12/2002 | Fichet | 725/105 |
| 2003/0033276 A1 | 2/2003 | Cheng et al. | |
| 2003/0123468 A1 | 7/2003 | Nong | |
| 2003/0200451 A1 | 10/2003 | Evans et al. | |
| 2004/0255209 A1 | 12/2004 | Gross | |
| 2005/0027920 A1 | 2/2005 | Fitzsimmons et al. | |
| 2005/0152352 A1 | 7/2005 | Jun et al. | |
| 2006/0256783 A1 | 11/2006 | Ayrapetian et al. | |
| 2007/0016756 A1 | 1/2007 | Hsieh et al. | |
| 2007/0226798 A1 | 9/2007 | Sibert | |
| 2008/0162793 A1 | 7/2008 | Chu et al. | |
| 2010/0260198 A1 | 10/2010 | Rojas-Cessa et al. | |
| 2011/0055439 A1 | 3/2011 | Chen et al. | |
| 2011/0179200 A1 * | 7/2011 | Sukonik et al. | 710/53 |
| 2013/0031239 A1 * | 1/2013 | Umanesan | 709/224 |

OTHER PUBLICATIONS

Xilinx. AXI Reference Guide. Mar. 7, 2011.*
ARM. AMBA AXI Protocol, v1.0. Specification. Mar. 19, 2004 (UK).
IBM. 128-bit Processor Local Bus. Architecture Specifications. Version 4.7. May 2, 2007 (US).

* cited by examiner

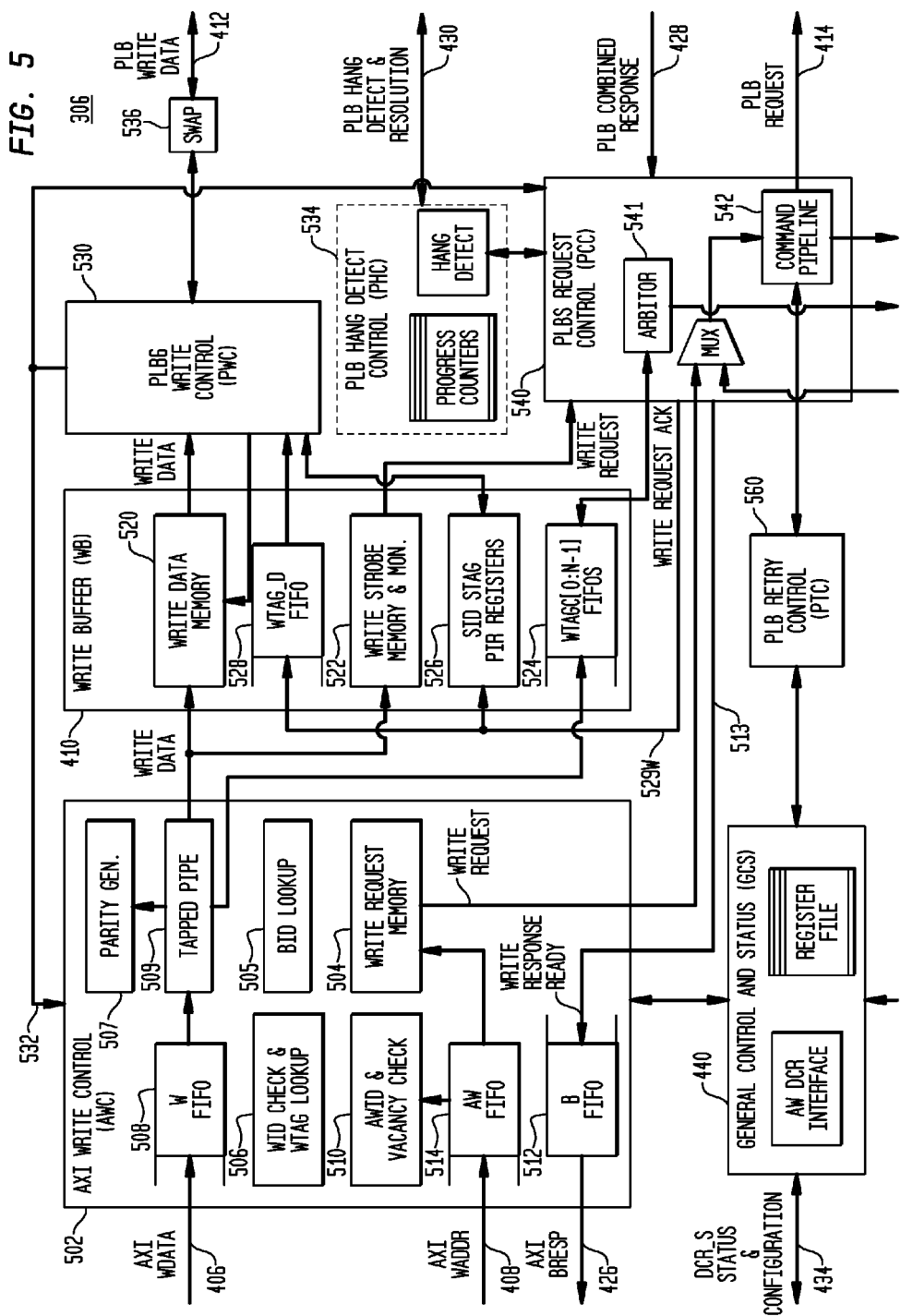

NON-BLOCKING PROCESSOR BUS BRIDGE FOR NETWORK PROCESSORS OR THE LIKE

CROSS-REFERENCE TO RELATED APPLICATIONS

This application claims the benefit of the filing date of U.S. provisional application No. 61/521,275 filed 8 Aug. 2011 the teachings of which are incorporated herein in their entireties by reference.

The subject matter of this application is related to U.S. patent application Ser. Nos. 12/979,665, 12/979,800, and 12/979,551, all of which were filed on 28 Dec. 2010, the teachings of all of which are incorporated by reference herein in their entireties.

BACKGROUND OF THE INVENTION

Network processors are generally used for analyzing and processing packet data for routing and switching packets in a variety of applications, such as network surveillance, video transmission, protocol conversion, voice processing, and internet traffic routing. Early types of network processors were based on software-based approaches with, general-purpose processors, either singly or in a multi-core implementation, but such software-based approaches are slow. Further, increasing the number of general-purpose processors had diminishing performance improvements, or might actually slow down overall Network Processor throughput. Newer designs add hardware accelerators to offload certain tasks from the general-purpose processors, such as encryption/decryption, packet data inspections, etc.

Because of the complexity of network processors and other system-on-chip (SoC) architectures, there is usually more than one kind of processor bus implemented on the chip, especially if there is a mixture of processor designs on the chip. Generally, one or more processors to communicate with external peripherals, memory, or each other using a processor bus. However, each processor design utilizes a different, incompatible, bus structure and protocol. Nonetheless, data and addresses need to be passed between buses using a bus "bridge." Because of the incompatibility of the buses, delays and other inefficiencies in the conveyance of data and requests from one bus to the other might be detrimental to operation of the chip as a whole. Thus, it is desirable to provide a bus bridge that efficiently interfaces between two different bus designs, each with their own transaction and request ordering rules and with low write and read request blocking to speed the overall data transfer rate.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to limit the scope of the claimed subject matter.

In one embodiment of the invention, a method for communicating in a bridge between a first bus and a second bus is provided. A candidate request having an identification field is received from the first bus, the identification field having a value. The candidate request is entered into one of a plurality of buffers selected based on the identification field value. A buffered request is read from a specified one of the buffers and transmitted over the second bus. Then a response to the transmitted request from the second bus is received and the received response is transmitted over the first bus. Then the read request is removed from the selected one of the buffers.

In another embodiment of the invention, a bridge is provided for communicating between a first bus and a second bus. The bridge includes a receiver, a memory, a plurality of buffers, a controller coupled to the memory and the plurality of buffers, and a transmitter. The receiver, coupled to the first bus, is adapted to receive candidate requests having an associated identification field. The memory, coupled to the receiver, stores requests and an associated identification field. The plurality of buffers, coupled to the memory, buffers requests corresponding to those stored in the memory. The transmitter, coupled to the plurality of buffers and the second bus, is adapted to transmit a buffered request from a specified one of the buffers to the subsystem for execution. The controller is adapted to match the identification field value of the candidate request to identification field values of requests in the memory and then enter the candidate request into the memory and into a) the same one of the plurality of buffers having at least one request therein with identification field value that matches that of the candidate request or b) one of the buffers having no requests therein, or c) one of the buffers having at least one buffered request with identification field value stored in the memory that does not match that of the candidate request. Then the request is removed from the memory and from the specified buffer after the buffered request is executed by the subsystem.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Table 1 defines a list of acronyms employed throughout this specification as an aid to understanding the described embodiments of the present invention:

TABLE 1

| | | | |
|---|---|---|---|
| USB | Universal Serial Bus | FIFO | First-In, First-Out |
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| | | MAI | Microprocessor Access interface |
| SoC | System-on-Chip | PLB | Processor Local Bus |
| AXI | Advanced eXtensible Interface | MPP | Modular Packet Processor |
| AMBA | Advanced Microcontroller Bus Architecture | PPCS | Power PC Component Subsystem |
| | | AWADDR | AXI write request data address |
| AWID | Write Request (Address) ID | AWLEN | AXI write request data (burst) length |
| FIFO | First-In-First-Out memory | | |
| ARID | Read Request (Address) ID | AWSIZE | AXI write request data (burst) size |
| BRESP | Write Response Status | CRC | Cyclic Redundancy Check |
| IP | Internet Protocol | UDP | User Datagram Protocol |
| TCP | Transmission Control Protocol | RID | Read Response (Data) ID |
| WID | Write Data ID | PTC | PLB Timer Control Block |
| PHC | PLB Hang Detect Control Block | PRC | PLB Read Control Block |
| PWC | PLB Write Control Block | AWC | AXI Write Control Block |
| PCC | PLB Request Control | WB | Write Buffer |
| ARC | AXI Read Control Block | BTAG | WTAG of completing write request |
| RB | Read Buffer | | |
| A2P | AXI bus-to-PLB | RTAG | Read Request Index Tag |
| BID | Write Response ID | WTAG | Write Request Index Tag |
| DCR | Device Control Block | EFRI | Empty FIFO Reservation Index |
| IIMTC | Initial ID Match | WACK | Write ACKnowledge |

Figure 1:
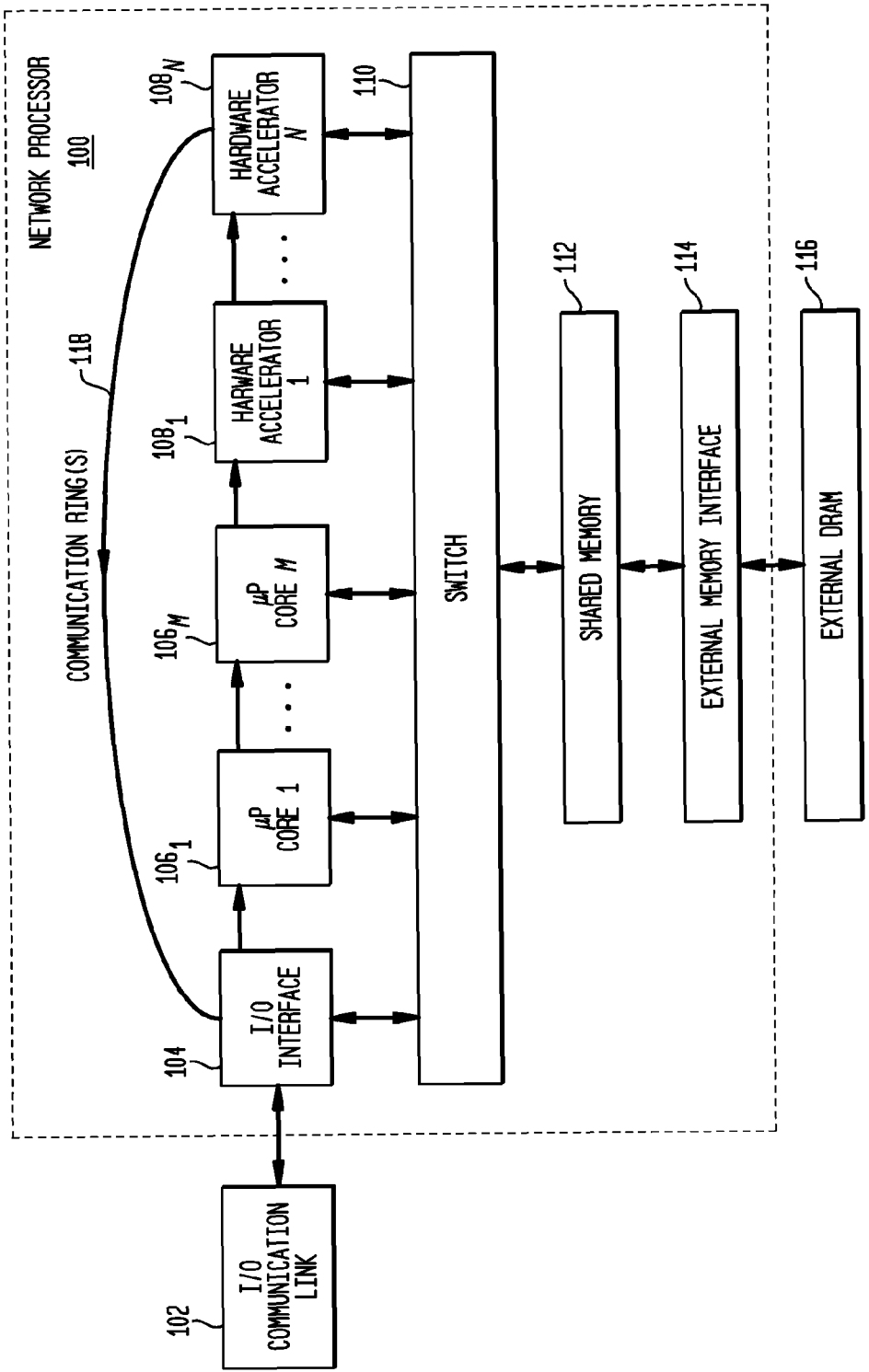
FIG. 1 shows a block diagram of a network communications processor.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled through switch 110 to shared memory 112. Switch 110 might be implemented as a non-blocking crossbar switch.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not needed by the various μP cores 106 and hardware accelerators 108 to free space in shared memory 112. The μP cores and hardware accelerators might interact with each other, for example, by one or more communication bus rings 118 that pass "tasks" from a source core to a destination core. As described herein, tasks are instructions to the destination core to perform certain functions, and a task might contain address pointers to data stored in shared memory 112, as described in related U.S. patent applications Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112. I/O interface 104 provides various types of I/O interface functions and, in exemplary embodiments described herein, is a request-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted externally of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round-robin (SDWRR) for every queue and scheduler. The MTM might also support multicasting. Each copy of a packet is scheduled independently and traverses down one or more different virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The SPP provides encryption/decryption capabilities and is a request-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and trees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache trashing and cache tracking overhead. Blocks in shared memory 112 might be dynamically allocated by the MMB to store data, with the blocks in one of the following sizes: 256, 2048, 16384, and 65536 bytes.

The PAB is a request driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files.

Figure 2:
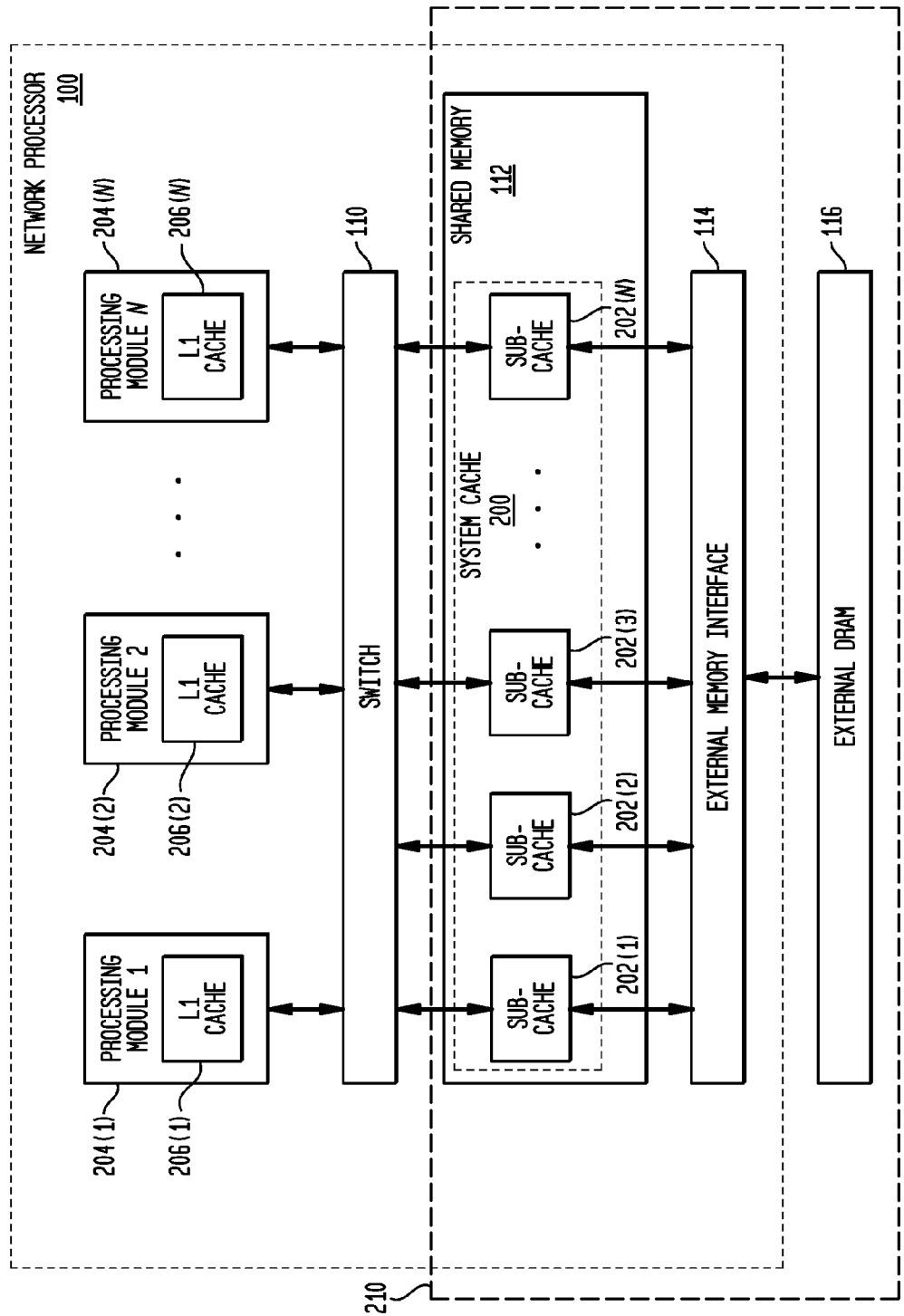
FIG. 2 shows a block diagram of the network communications processor of FIG. 1 with additional details.

FIG. 2 shows a block diagram of an exemplary embodiment of system cache 200 of network processor 100, in accordance with embodiments of the present invention. As shown in FIG. 2, system cache 200 might be implemented in shared memory 112. System cache 200 might include one or more sub-caches, shown as sub-caches 202(1)-202(N). Sub-caches 202(1)-202(N) might be employed to cache data from any μP core or accelerator (e.g., μP cores 106 or accelerators 108) of network processor 100. As indicated by dashed line 210, shared memory 112 and external memory 116 might generally be referred to as system memory 212.

Sub-caches 202(1)-202(N) might be addressed via switch 110 in such a way as to balance access to the caches, referred to herein as striping, helping to avoid hot spots in shared memory 112, improve performance of the caching in and out of external memory 116, and reduce cache access bottlenecks. Thus, in embodiments of the present invention, each sub-cache 202(1)-202(N) might form a memory array, and the number of system caches might preferably be implemented as a power of two. One or more memory blocks might be allocated to each sub-cache 202(1)-202(N). In embodiments of the present invention, each sub-cache 202(1)-202(N) might be implemented as an N-way associative cache employing a least recently used (LRU) caching algorithm. In some embodiments, each sub-cache 202(1)-202(N) might have a total size of 512 kB and a cache line length of 256B.

As shown in FIG. 2, one or more of processing modules 204(1)-204(N) might have a corresponding local level one (L1) cache, shown as L1 caches 206(1)-206(N). The function of L1 caches 206(1)-206(N) is to act as an interface to system cache 200 for client processing modules 204(1)-204(N) of network processor 100. L1 caches 206(1)-206(N) might be referred to as "pipeline" caches, since L1 caches 206(1)-206(N) might typically be employed only for certain ones of client processing modules 204(1)-204(N) that access system cache 200 as part of an execution pipeline.

Figure 3:
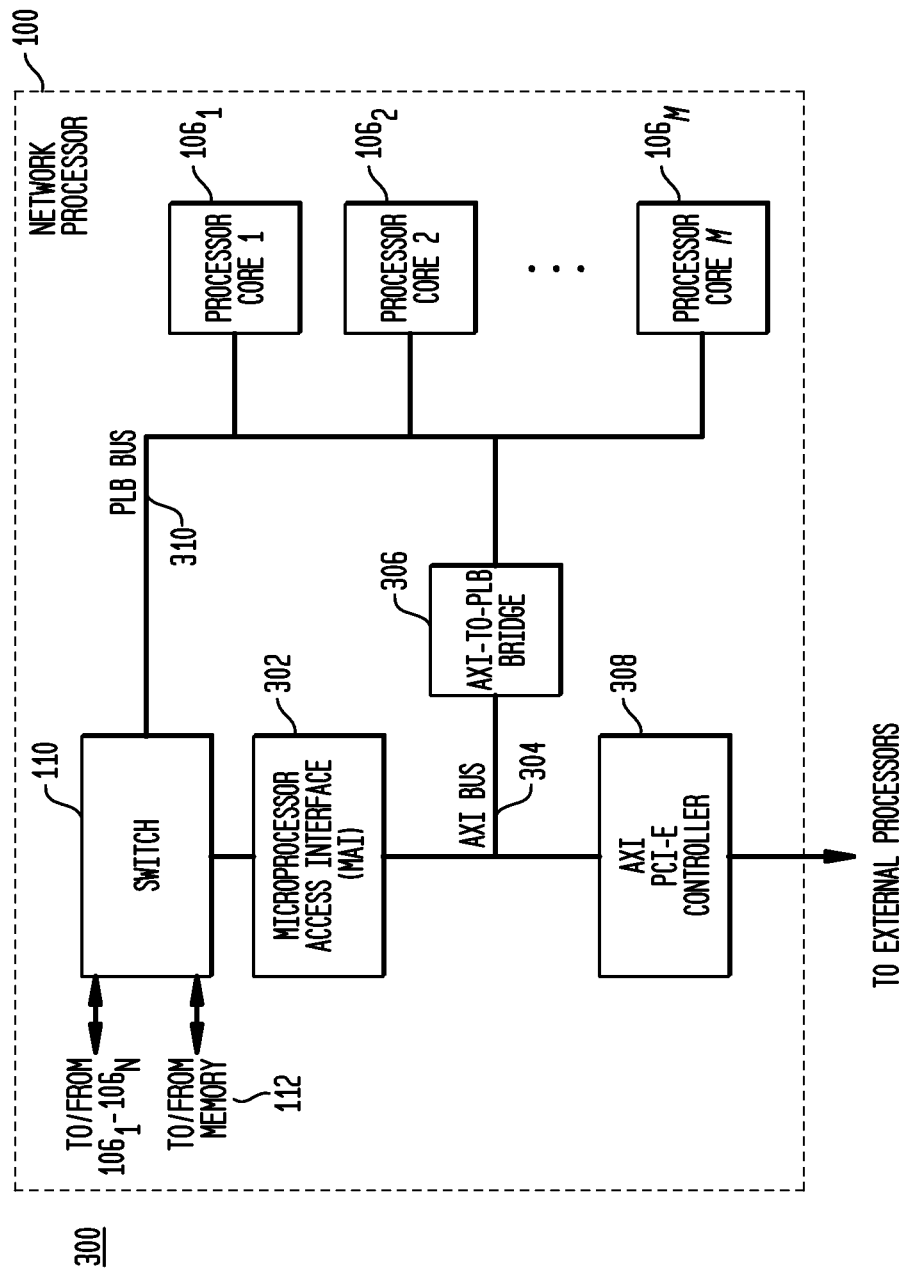
FIG. 3 shows a block diagram of an exemplary communication bus of the network communications processor of FIG. 2.

FIG. 3 shows a block diagram detailing an interface 300 between processors $106_1$-$106_M$ and crossbar switch 110 and external processors or other off-chip peripherals. As shown, network processor 100 contains one or more microprocessors $106_1$-$106_M$, each of which might include internal L1/L2 caches (not shown). The multiple processors implement cache coherency between themselves as is well known in the art. Cache misses from the processors go across switch 110 to on-chip shared memory 112 and, if necessary, external memory 116. Interface 300 might also include a standard set of peripheral interfaces (USB, EEPROM, etc., not shown) on or off the chip. For example, as shown in FIG. 3, PCI-E interface 308 might be provided. PCI-E interface 308 allows for any external device operating in conformance with the PCI-E protocol to be attached to Network Processor 100. For example, PCI-E interface 308 might allow one or more external processors to access shared memory 112 and other resources on the chip, such as communication rings 118. Thus, the task communication mechanism employed by the internal processors can also be used for message passing between the internal and external processors.

Communication between processors $106_1$-$106_M$ and memory 112 via switch 110 occurs via two paths, one path for processor instructions requiring latency less than a predefined threshold ("minimal latency") and the other path for other types of information, such as tasks sent via the virtual pipeline, that are not as sensitive to memory latency. Memory access interface (MAI) 302 handles instructions that are less sensitive to memory latency. MAI 302 is an interface between switch 110 (and memory 112) and the internal processor(s) $106_1$-$106_M$ and any attached processor(s) external to network processor 100. MAI 302 provides an interface for different kinds of microprocessors to receive and send tasks like any of the internal cores coupled to shared memory 112.

For example, MAI 302 might be coupled to PCI-E interface 308. As illustrated here, MAI 302 connects to switch 110 for its task-based communications. For processor communications, MAI 302 is coupled to AXI bus 304. The AXI protocol is a higher frequency implementation of the Advanced Microcontroller Bus Architecture (AMBA) introduced by ARM Ltd. A complete explanation of the AMBA architecture and the AXI bus operation can be found in "AMBA AXI Protocol Specification", copyright 2003, 2004, ARM Limited, the contents of which are incorporated herein in its entirety. AXI bus 304 enables MAI 302 to communicate with any peripheral device or processor that supports the AXI protocol. AXI-to-PCI-E controller 308 might be used by MAI 302 to allow external processors to access AXI bus 304. Internal processors $106_1$-$106_M$ access AXI bus 304 via AXI-to-PLB Bridge 306. PLB is a proprietary microprocessor bus architecture introduced by IBM. In embodiments of the present invention, processors $106_1$-$106_M$ are Power PC® processors that utilize PLB 310 for communication between processors and switch 110. AXI-to-PLB (A2P) bridge 306 allows processors $106_1$-$106_M$ to communicate with AXI bus 304, and thus external processors (via AXI-to-PCI-E controller 308).

MAI 302, AXI-to-PCI-E controller 308 and AXI-to-PLB Bridge 306 make the architectural design of network processor 100 "agnostic" to the chosen processor architecture for processors $106_1$-$106_M$ or any external processors. For example, a given design might employ Pentium® or Power PC® processors, or a combination of different processors, without changing the interfaces to various software modules of network processor 100.

As mentioned above, task communication within the architecture of Network Processor 100 is handled by MAI 302. MAI 302 allows the processors to send and receive tasks to and from other processors or other cores within the architecture. MAI 302 is also used for configuration updates. All accesses that MAI 302 makes to memory 112 are fully coherent with the processor receiving or issuing a task. If an external processor supports I/O coherency for PCI-E transactions, then the external processors are coherent as well. All interactions with MAI 302 are preferably non-blocking to the processor and generally involve only local memory updates. Processor overhead is reduced to a few cached memory accesses (no I/O cycles required). Advantageously, MAI 302 allows the programming model might be substantially the same for internal and external CPUs. The programming model might also be substantially the same for special purpose processors, such as digital signal processors.

Figure 4:
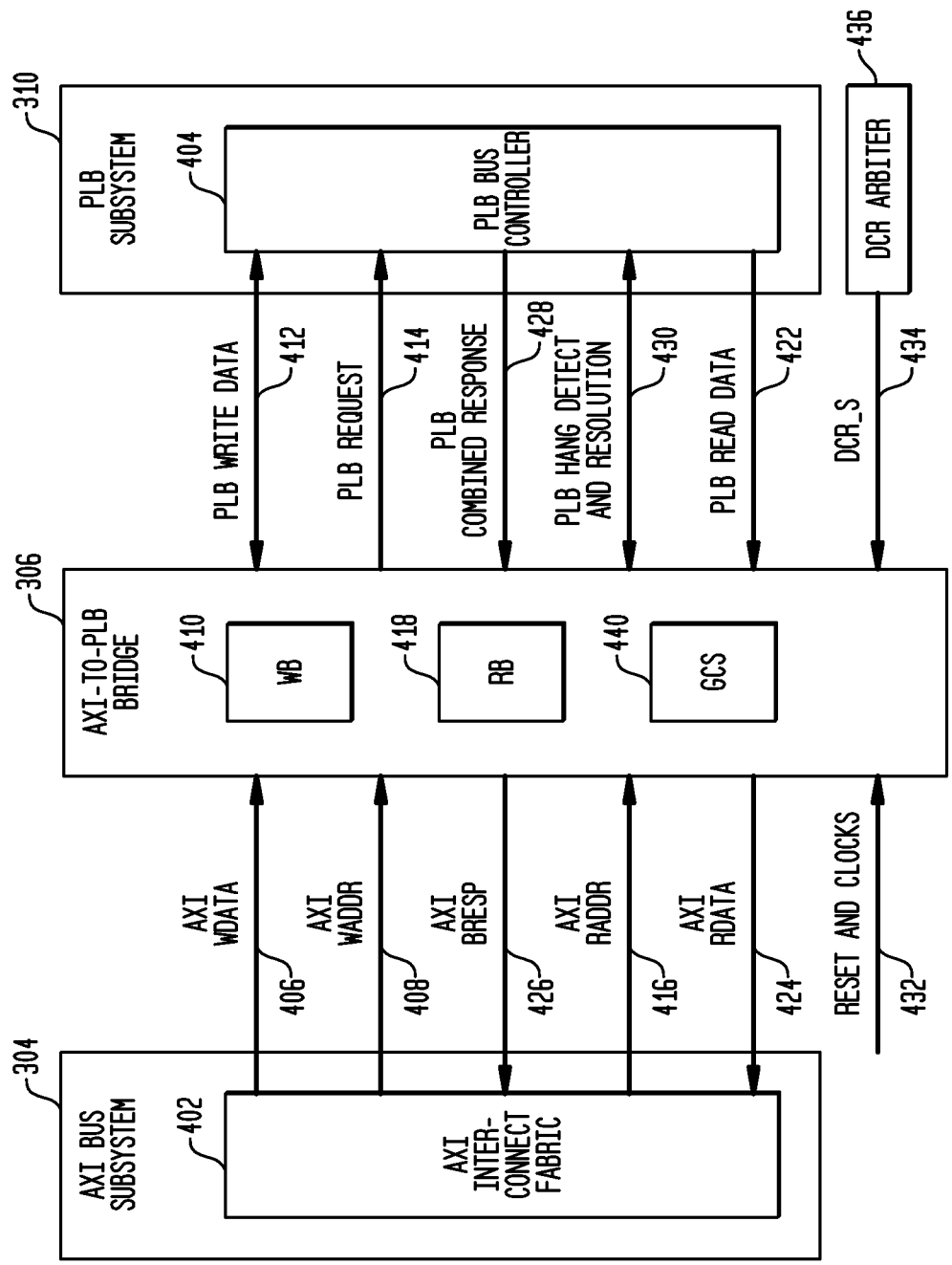
FIG. 4 shows a simplified interface diagram of the AXI-to-PLB bridge of the network communications processor of FIG. 3.

Turning to FIG. 4, an AXI bus-to-PLB (A2P) top-level interface diagram is shown to provide details regarding signal flow between the AXI bus 304 and PLB 310 and a brief description of the purpose of various buses between the AXI bus 304 and the bridge 306, as well as between PLB 310 and the bridge 306. The AXI bus is a subsystem 304 having an interconnect fabric 402 for passing information from and to AXI bus clients such as those shown in FIG. 3. Further details on the interconnect fabric 402 can be found in the aforementioned AXI Protocol Specification. Similarly, the PLB 310 is a subsystem having a PLB controller 404, a proprietary SoC IP block instantiated within the Power PC Component Subsystem (PPCS) available from IBM. The bus controller 404 arbitrates address and request information, along with data read from the PLB, passing through the controller 404. In this embodiment and as will be described in more detail below, write requests originating from the AXI bus 304 are transmitted to the bridge 306 via AXI WADDR channel 408 and write data over AXI WDATA channel 406 and are assembled in the Write Buffer block (WB) 410. Data to be written, stored in WB 410, is sent to the PLB controller via channel 412 and the write address over channel 414. Read requests over AXI RADDR channel 416 originating from the AXI bus 304 are assembled in the read buffer block (RB) 418 and sent to the PLB controller over channel 414. In response, data from the PLB 310 are received over channel 422, assembled in the RB 418, and sent to the AXI bus via channel 424. Details regarding the channels can be found in the aforementioned AXI Protocol Specification. For purposes here, the AXI system bus protocol is burst based. Every transaction has address and control information on either channel 408 or 416 that describes the nature of the request for data to be transferred. The control information includes the number of beats of a burst and the size in bits of the beats. Also included are request IDs to individualize requests and provide a means for identifying the data transfer and request culminating response phases that are to be correlated with such particular request.

The AXI data transfer phases or bursts also include control information. Each beat of channel 406 write data is accompanied by write strobe information as well as the write data ID and last status. Each beat of read data 416 is accompanied by read response status, a read data ID, and a last beat flag. If a write is to occur, then write data from the AXI bus is provided over channel 406 and, in turn, to the PLB over channel 412. When a read request is executed, data from the PLB over channel 422 is passed to the AXI bus over channel 424. Channel 426 is used to convey the write response status of AXI control signals described in section 2.4 of the above-referenced AMBA AXI Protocol Specification.

Only the first and last beats of a data burst may be less than a quad-word on the PLB subsystem 310. The PLB request's address is adjusted if the leading bytes of a quad-word are not to be requested as part of the first beat. The PLB request's byte enable indicates which bytes are to be used for the last beat of the burst.

However, the AXI bus 304 allows bursts using various sizes with either quad-word or smaller than quad-word beats. Thus the bridge 306 will have to perform byte lane reordering and beat transfer size transformations for both read and write transfers. In some cases this will also require splitting of some of these AXI transfers into multiple PLB transfers because the AXI burst length can exceed the maximum PLB burst length. For write transfers, the byte count is not known until the last beat of the transfer is received from the AXI bus. Splitting of PLB requests may be necessary to prevent requests from crossing PLB 128-byte boundaries.

On the PLB side of the bridge 306, channel 428 conveys the status of various requests sent to controller 404, such as read and write requests, sent over channel 414 to PLB controller 404 in response to AXI bus-initiated read and write requests. Bidirectional channel 430 handles hang detection and resolution. It provides a means for the bridge 306 to assert that it is not making forward progress with requests to the PLB. The bridge 306 maintains per WTAG and RTAG progress counters in sub-block 534 (not shown here but described in more detail below in connection with FIG. 5) that increment in response to a PLB system count increment pulse when the bridge 306 has outstanding AXI requests. Channel 430 also provides a control signal that bridge 306 monitors and, when that control signal is asserted, the bridge 306 will not issue any new requests via PLB request channel 414, with the exception of the case where the bridge 306 is asserting that it is in the hung state it may re-issue requests that have been previously issued for which a combined response of retry was received. Channel 428 conveys the combined response of the PLB slaves to the bridge 306 to issued PLB read and write requests. The combined response can be any one of acknowledge, retry, or error. The slave-tag and slave-ID are provided to the bridge 306 to allow the bridge 306 to identify each beat of write data onto the channel 412 during writing of data from the bridge 306 to the bus controller 404.

The slave tag is given to a PLB master as part of the combined response on channel 428 to a write request. The slave tag originates in the slave targeted by the master and is passed through the PLB Bus Controller 404 to the bridge 306. The bridge 306 provides the slave tag along with the data in the PLB write data transfer phase. This allows the target PLB slave to match the transferred data with the earlier request. The slave ID is given to the master as part of the combined response 428 to a write request. This slave ID originates in the PLB controller 404. The bridge 306 provides this slave ID along with the data in the PLB write data phase, so that the PLB controller 404 can route the write data to the correct target slave.

Reset signals and various clocks for the bridge 306 are present on channel 432. Control, configuration, and other data are carried over channel 434 from and to Device Control Register (DCR) arbiter 436, part of the PLB structure. The arbiter 436 arbitrates access of the DCR masters to the DCR bus slaves of which the bridge 306 is a DCR slave. Internal configuration and status registers in the bridge 306 are accessible by DCR masters.

In this exemplary embodiment, the bridge 306 is an AXI bus "slave" and a PLB "master", i.e., bridge 306 does not initiate operations on the AXI bus 304 but does initiate operations on the PLB 310. It is understood that the bridge 306 may be an AXI bus master and a PLB slave or a master on both buses.

Upon reset of the Network Processor 100 (FIG. 1), all internal state machines, control registers, data registers, and FIFO memories are cleared in the bridge 306. Following reset, the bridge 306 should be in an operational configuration, but the General Control and Status registers (GCS) 440 may be modified over the Device Control Register Slave channel (DCR_S) 434 to reconfigure the bridge 306.

Figure 5:
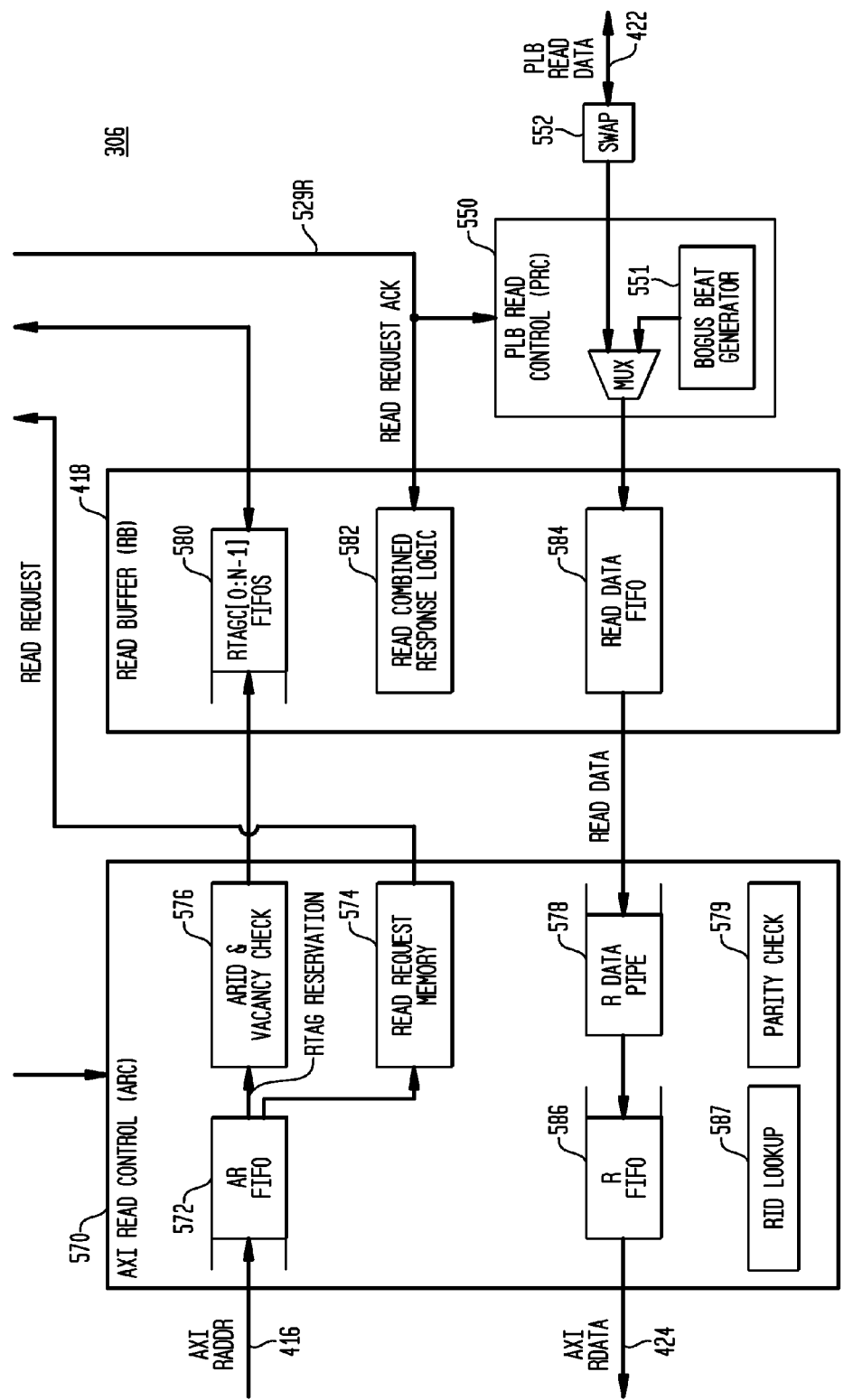
FIG. 5 illustrates the AXI-to-PLB bridge of FIG. 4 in more detail and in accordance with embodiments of the present invention.

FIG. 5 illustrates the bridge 306 in more detail. The functions of the various blocks in the bridge 306 are described herein.

The AXI Write Control (AWC) block 502 interfaces to the AXI slave write channels 406, 408, 426, to accept write requests (commands), write address, and write data from the AXI bus 304, and communicates write channel responses to the AXI BRESP 426. As explained in more detail below, the AW, W, and B FIFOs in AWC 502 provide clock domain crossing, rate adaptation, and some buffering for the WADDR (408), WDATA (406), and BRESP (426) write channels. The Write Request Memory 504 stores AXI Write Channel requests by entries indexed by WTAG indexes from the AWID block 510, described below. The memory 504 may be implemented as a group of register bit, vector, and counter arrays and is a memory indexed, in this embodiment, with values ranging from zero to fifteen. Thus the memory 504 is divided into sixteen portions. Each portion represents a potential write request traffic context comprising an AXI write request from bus 408, the beats of write data and write strobe information from bus 406, the status and progress of the request. Different requests can simultaneously proceed through various pipeline states from clock cycle to clock cycle. As will be explained in more detail in connection with FIG. 8, when a new write request is presented to the AWC 502, the vacancy status of the write request memory 504 is checked for a free WTAG index, and for the new request's write address (AWADDR) and AWID, one portion identifying the AXI master, the other portion used by the AXI master to distinguish one of its requests from another having been already present. Unless there are no free WTAG indices available, if the AWID is already present then the request is assigned to one of the FIFOs 524 (shown in more detail in FIG. 6) with other requests having the same WTAG index. Otherwise, the request must wait in the AW FIFO 514 for the corresponding WTAG entry to be de-allocated. The number of FIFOs 524 depends on the range of values the WTAG index can have (e.g., 0-15 or 16 values) but generally is greater than two and no more than the number of values the WTAG index can have.

Figure 6:
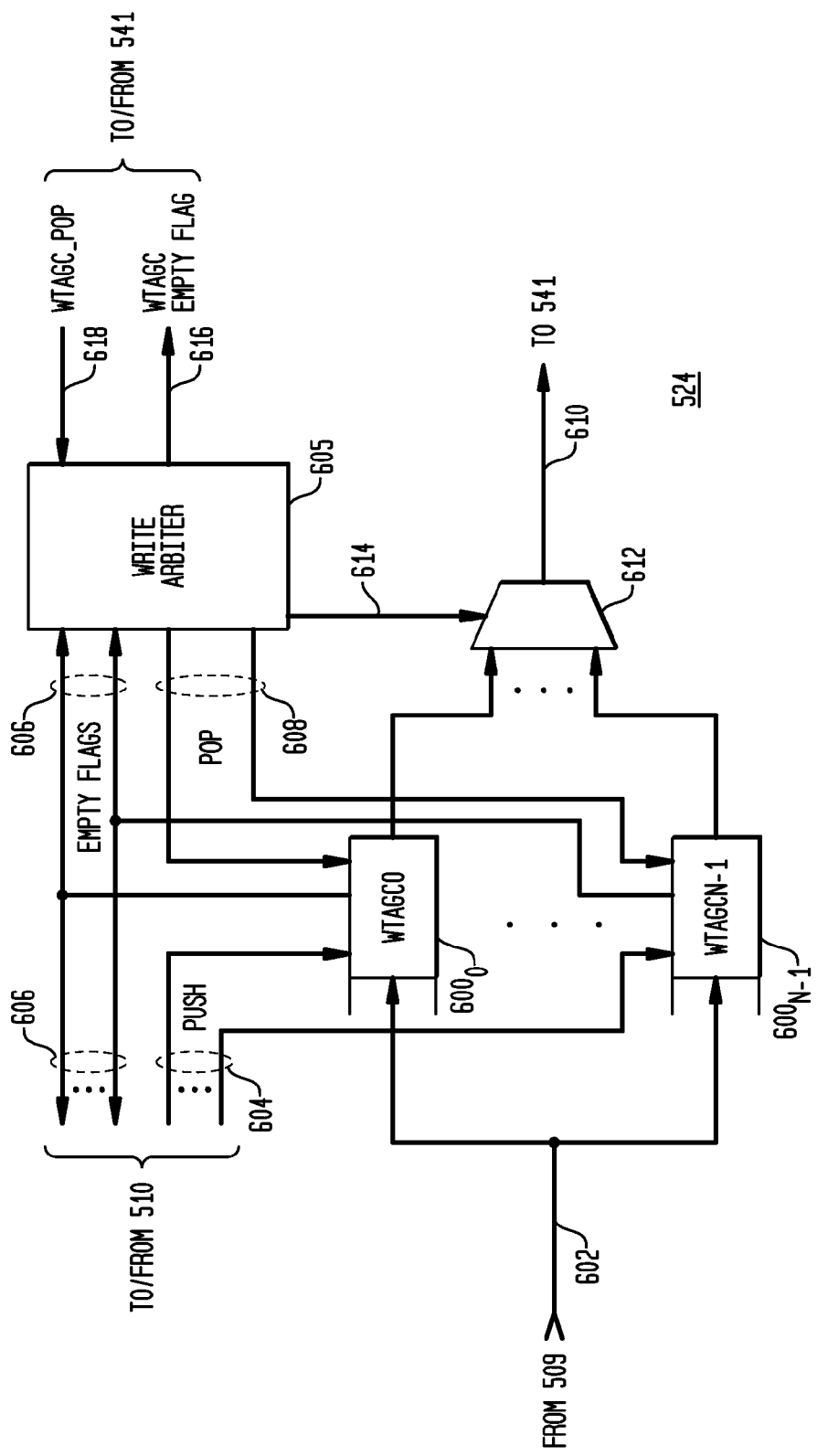
FIG. 6 shows a simplified block diagram of block 524 within the AXI-to-PLB bridge of FIG. 5, in accordance with embodiments of the present invention.

Turning to FIG. 6, additional details regarding the WTAGC [0:N−1] FIFOs 524 is illustrated. In this embodiment, one of N FIFOs $600_0$-$600_N$ receives, via bus 602, a write request control tag (WTAG) generated by block 509 (FIG. 5), described below, when the one FIFO is enabled by a PUSH signal from block 510 on a corresponding one of leads 604, resulting in the WTAG being "pushed" onto the enabled FIFO. A write arbiter 605 receives an empty flag, indicating that the corresponding FIFO is empty, from each FIFO via leads 606 and controls the reading or "popping" of write requests from the FIFOs via leads 608. Popped write requests are sent via bus 610 to the arbiter 541 (FIG. 5) through a multiplexer 612 controlled via bus 614 from write arbiter 605. Write arbiter 605 scans the empty flags 606 to determine if any write requests are pending in one or more of the FIFOs $600_0$-$600_{N−1}$ and if a request is pending, signals to arbiter 541 that a write request is pending via signal WTAGC EMPTY FLAG on lead 616. In one embodiment the arbiter 605 uses a Least Recently Used (LRU) technique or, in alternative embodiments, other techniques such as a simple round-robin (sequential) technique, random, most full FIFO, or a prioritized selection technique (e.g., selecting the lowest or highest numbered FIFO if that FIFO is not empty so that requests may be prioritized depending on which one of the FIFOs $600_0$-$600_{N-1}$ a WTAG is assigned) to select which one of the FIFOs $600_0$-$600_{N-1}$ as the source of the write request control tags (WTAGs) to be sent to the arbiter 541. Generally, when the arbiter 571 chooses to execute an AXI write (in response to the WTAGC EMPTY FLAG on lead 716 indicating that a write request is pending), the arbiter 541 requests arbiter 605 via lead 618 to provide a WTAG from a FIFO $600_0$-$600_{N-1}$ selected by arbiter 605 using one of the above-described selection techniques. The arbiter 605 then configures the multiplexer 612 to couple the output of the selected FIFO $600_0$-$600_{N-1}$ to bus 610 and the selected write request WTAG passes to the arbiter 541 via bus 610. Once the PCC 540 (FIG. 5) issues a write request acknowledge (WACK), the arbiter 605 enables a corresponding one of the leads 608 to "pop" or remove the write request WTAG from the selected FIFO. Then the arbiter 605 again scans the leads 606 to determine if another write request is pending.

While the FIFOs $600_0$-$600_N$ might be in one embodiment considered as first-in-first-out memories or the like, they are buffers that might be implemented as addressable registers or an addressable memory and might not operate on a first-in-first-out basis.

Returning to FIG. 5, once having passed the admissibility check in AWID block 510 operating upon contents of memory 504, as described below in connection with FIG. 8, the candidate request in FIFO 514 will be admitted and its corresponding request information stored in memory 504.

If WID check and WTAG lookup 506 and AWID block 510 (both described in more detail below) determine if the new AXI write request write data in FIFO 508 to correspond to an outstanding request of a context stored in memory 504, then the AXI Write Data, WID, and Write Strobes from bus 406 are popped from the W FIFO 508. Memory 504 also contains a per WTAG indexed Boolean status that indicates if the last beat of a context's write request write data has been received, and WID check block 506 takes this into consideration in order that PLB memory boundaries between request write data be conserved. Each pop of the W FIFO 508 reads one beat that had been transferred to the W FIFO from the AXI Write Data channel 406. The popped WID is used to lookup the WTAG index by matching the stored AWID. The AWC 502 maintains per WTAG current address and beat counters in memory 504 that are updated as each beat of data is popped from the FIFO 508. AWC logic (not shown) examines the current address counter, AXI LENGTH (AWLEN), and AXI SIZE (AWSIZE) encoded in the AXI write request on bus 408 to determine if it is appropriate to merge the Write Data and Write Strobe information from the current beat with that of previous beats into a common quad-word, or to allocate a new WTAG index, A parity generator 507 calculates parity over the merged Write Data quad-word discussed above. The Write Data and corresponding parity are merged and written to the WB write data memory (WDM) 520 addressed by the WTAG index and the offset from a per-WTAG context pointer from memory 504. Similarly, the merged AXI write strobes associated with AXI write data in FIFO 508 are written to the WB Write Strobe Memory (WSM) 522. As explained in more detail below, the PCC 540 sends a write request acknowledge to the WB 410 when it receives, via bus 529W, a combined response over channel 428. The write request acknowledge on bus 529W from PCC 540 includes a last write request done status as well as the WTAG index of the combined response. Also included on the bus 529W is the status as to whether the combined response indicates an acknowledge response or an error response. A tapped pipe 509 monitors the write strobe portion of the write data from channel 406 for unacceptable write strobe patterns as defined in the AXI specification referred to above. AWC 502 combines illegal and unacceptable write strobe pattern status information on channel 408 write request requests to create bogus generated write request responses. The bogus responses are necessary in order to provide a means to respond to AXI Write requests on channel 408 for which there will be no corresponding complete PLB write request. AWC 502 arbitrates by interpolating bogusly generated write request responses between write request acknowledge (WACK) responses from PCC 540. AWC 502 combines the combined response error and WTAG index status information with the bogus responses to provide a formatted response to the B FIFO 512 for delivery to the AXI BRESP channel 426. The BID for the BRESP is looked up using the response WTAG index provided by the alternate sources PCC 540 or AWC 502 for use as an index, the PCC 540 as the source when the response is to be an "okay" (an acknowledged combined response), and the AWC 502 as the source when the response is to be a "slverr" (an errored combined response or an unsupported (bad) request), The PWC 530 controls the PLB write data channel 412. For acknowledged PLB write requests, the PWC 530 loads the WTAG index for retrieval of the request corresponding to that request. The PWC 530 uses that WTAG index to retrieve the request information from per context registers 526 and memory 520, requests the PLB write data channel 412 and, when granted access, supplies that data to the PLB write data channel 412.

The PLB Request Control (PCC) block 540 issues requests over the PLB request channel 414 and receives responses on the PLB combined response channel 428. When the combined response indicates an read or write request acknowledgement from the PLB controller 404 over bus 428 has been received, a write request acknowledge on bus 529W is presented to the PLB Write Control (PWC) 502 for a write request, or a read request acknowledge on bus 529R to the Read Combined Response Logic block 582 for a read request, as appropriate. In addition, for a write, the WTAG index is passed to the WTAG_D FIFO 528 via bus 529W after a write request acknowledgement is received.

If the AXI requests a read transaction, but there is a PLB error, the AXI read data channel requires a response consisting of the number of beats requested, and an error response on channel 424 for each generated beat on channel 424. In response to the read request acknowledgement on bus 529R, a bogus beat generator 551 in the PRC block 550 generates dummy data for transmission to the AXI bus over channel 424.

The RTAG index (during a read) or the WTAG index (during a write) is sent to the PLB in a bit field of the PLB request over channel 414. The index is returned by the PLB on each PLB beat of the read data transfer burst on channel 422 for a read request. The PRC block 550 recovers the RTAG index and passes it into the read Data FIFO 584 along with the parity and the read data. The RTAG index for PLB read requests might not be returned by the PLB and, thus, might not be used. The bogus beat generator 551 also stuffs RTAG indexes for the bogusly generated beats into the FIFO 584. Because the PLB read data phase is not flow controlled and does not forgive overruns, an arbiter (not shown) multiplexes the bogus beats with the PLB beats. Thus the read data FIFO data stream can have interlaced beats that are bogus and not bogus. Also, because of splitting, read data from one AXI request might be fed to the PRC 550 immediately back-to-back following a portion of another AXI requests read data before either are complete. To handle this situation, the ARC 570 reads FIFO 584 and uses RTAG indexes to look up the RID from the read request memory 574, If the response on channel 428 is a retry response to a request, the PLB Timer Control (PTC) 560 will provide a pseudo-randomly determined delay period after which it will communicate to the PCC 540 that the request is to be retried.

The PLB hang Detect Control (PHC) block 534 provides a mechanism for ensuring forward progress on outstanding requests and otherwise asserts a hang detect signal. The PRC block 550 accepts valid data after bit swapping in block 552 from the PLB channel 422 in response to previously acknowledged read requests. The PRC 550 must be able to accept a beat of such previously requested data on every clock. This data may be stored in the RB 418, later to be retrieved by the ARC 570 and delivered to the AXI RDATA channel 424.

The PLB Write control (PWC) block 530 requests the PLB write data bus 412 after receiving a write request acknowledgement response through FIFO 528 or from a faster more direct path from the PCC 540 (not shown). When the PLB BUS CONTROLLER 404 grants the write data bus 412, the master must send a burst of write data stored in the write data memory 520. The PWC 530 posts last write completion status over bus 532 to the AWC 502, which de-allocates the write request tag therein. Completion of delivery of a context's write data to the PLB channel 412 could be many clock cycles later than the write request terminating event that triggers the pushing of the BRESP to B FIFO 512, The WTAG indexed context thus may persist far longer than the write request.

The AXI Read Control (ARC) block 570 interfaces to the AXI slave read channels 416, 424, to accept requests, and communicates read channel data and responses to ARC 570. Clock domain crossing, rate adaptation, and some buffering are provided by the AR and R FIFOs in ARC 570 for the RADDR (416) and RDATA (424) read channels. The Read Request Memory 574 stores AXI Read Channel requests by RTAG-indexed entries. In this embodiment, memories 574 and 504 are indexed with values ranging from zero to fifteen. Thus both memories are divided into sixteen portions. Each portion of memory 574 represents a potential read request traffic context. In the read path, the RTAG index is associated with data received over channel 422. Thus, the RTAG index might change from beat-to-beat and may be intermingled with other read request PLB beats and bogusly-generated bad beats from PRC 550. Since PLB beats are quad-words, and AXI beats might be less than quad-words, the pipeline 578, when appropriate, repeats PLB data beats into the R FIFO 586, and uses the RTAG index to look up the RID from an array of ARIDs, using the RID Lookup sub-block in ARC 570 operating on information stored in memory 574. Also for each AXI beat, the AXI size and length is needed to generate a flag indicating the last beat of the burst is being proffered on channel 424. In addition, the parity of the PLB beats is checked in parity check block 579 and any parity errors are reported beat by beat in the response on bus 424 if parity checking is enabled. AXI read requests on channel 416 are effectively flow controlled by the RTAG reservation and ARID and RTAG vacancy checks within 576. If there is no vacancy in the RTAG memory 576, the AXI request is not popped from FIFO 572.

Figure 7:
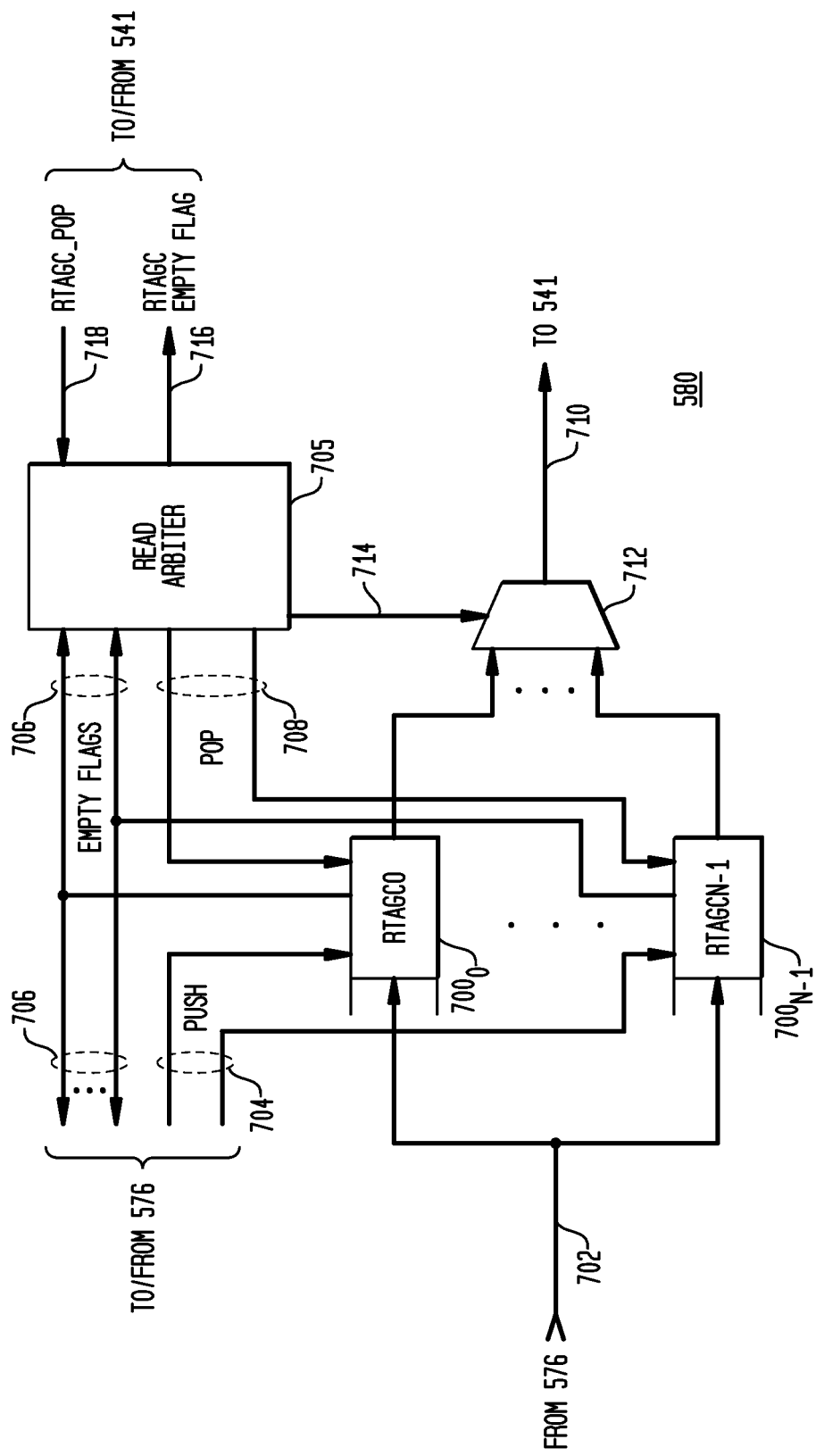
FIG. 7 shows a simplified block diagram of block 580 within the AXI-to-PLB bridge of FIG. 5, in accordance with embodiments of the present invention.

As will be explained in more detail in connection with FIG. 8, when a new read request is presented to the ARC 570, the vacancy status of the read request memory 574 is checked for a free RTAG index, and for the new request's ARID having been already present. Unless there are no free RTAG indices available, if the ARID is already present then the request is assigned to one of the FIFOs 580 as shown in FIG. 7 with other requests having the same RTAG index. Otherwise, the request must wait in the AR FIFO 572 for the corresponding RTAG entry to be de-allocated. The number of FIFOs 580 depends on the range of values the RTAG index can have (e.g., 0-15 or 16 values) but generally is greater than two and no more than the number of values the RTAG index can have.

Turning to FIG. 7, additional details regarding the RTAGC [0:N−1] FIFOs 580 is illustrated. In one embodiment, one of N FIFOs $700_0$-$700_{N-1}$ receives, via bus 702, a read request control tag (RTAG) generated by block 576 (FIG. 5), described below, when the one FIFO is enabled by a PUSH signal from block 576 on a corresponding one of leads 704, resulting in the RTAG being "pushed" onto the FIFO. Additional or fewer FIFOs may be used as required. A read arbiter 705 receives an empty flag, indicating that the corresponding FIFO is empty, from each FIFO via leads 706 and controls the reading or "popping" of read requests from the FIFOs via leads 708. Popped read requests are sent via bus 710 to the arbiter 541 (FIG. 5) through a multiplexer 712 controlled via bus 714 from read arbiter 705. Read arbiter 705 scans the empty flags 706 to determine if any read requests are pending in one or more of the FIFOs $700_0$-$700_{N-1}$ and if a request is pending, signals to arbiter 541 that a read request is pending via signal RTAGC EMPTY FLAG on lead 716. In one embodiment the arbiter 705 uses a Least Recently Used or read (LRU) technique or, in alternative embodiments, other techniques such as a simple round-robin (sequential) technique, random, most full FIFO, or a prioritized selection technique (e.g., selecting the lowest or highest numbered FIFO if that FIFO is not empty so that requests may be prioritized depending on which one of the FIFOs $700_0$-$700_{N-1}$ a RTAG is assigned) to select which one of the FIFOs $700_0$-$700_{N-1}$ as the source of the read request control tags (RTAGs) to be sent to the arbiter 541. Generally, when the arbiter 571 chooses to execute an AXI read (in response to the RTAGC EMPTY FLAG on lead 716 indicating that a read request is pending), the arbiter 541 requests arbiter 705 via lead 718 to provide an RTAG from a FIFO $700_0$-$700_{N-1}$ selected by arbiter 705 using one of the above-described selection techniques. The arbiter 705 then configures the multiplexer 712 to couple the output of the selected FIFO $700_0$-$700_{N-1}$ to bus 710 and the selected read request RTAG passes to the arbiter 541 via bus 710. Once the PCC 540 (FIG. 5) issues a read request acknowledge 529R, the arbiter 705 enables a corresponding one of the leads 708 to "pop" or clear the read request RTAG from the selected FIFO. Then the arbiter 705 again scans the leads 706 to determine if another read request is pending.

While the FIFOs $700_0$-$700_N$ might be in one embodiment considered as first-in-first-out memories or the like, they are buffers that might be implemented as addressable registers or an addressable memory and might not operate on a first-in-first-out basis.

Returning to FIG. 5, the AXI Read Control (ARC) block 570 interfaces to the AXI slave read channels 416, 424 to accept read requests and read addresses, and to deliver read data and read response status to the AXI bus 304. As explained in more detail below, the AR, and R FIFOs in ARC 570 provide clock domain crossing, rate adaptation, and some buffering for the RADDR (416), and RDATA (424) read channels. The Read Request Memory 574 stores AXI Read Channel requests by entries indexed by RTAG indexes from ARID and vacancy check block 576 operating on previously stored contexts in memory 574. The memory 574 may be implemented as a group of register bit, vector, and counter arrays and is a memory indexed, in this embodiment, with values ranging from zero to fifteen. Thus, the memory 574 is divided into sixteen portions. Each portion represents a potential read request traffic context comprising an AXI read request from channel 416, the beats of read data, and the status and progress of the request channel 424. Different requests can simultaneously proceed through various pipeline states from clock cycle to clock cycle. When a new read request is presented to the ARC 570, the vacancy status of the read request memory 574 is checked by block 576 for a free RTAG index, and for the new request's ARID (comprising a request ID from an AXI request, one portion identifying the AXI master, the other portion used by the AXI master to distinguish one of its requests from another having been already present). Unless there are no free RTAG indices available, if the ARID is already present then the request is assigned to one of the FIFOs 580 with other requests having the same RTAG index. Otherwise, the request must wait in the AR FIFO 572 for the corresponding RTAG entry to be de-allocated. Read data is popped from 584 to the RDATA pipe 578. The RDATA pipe accommodates the smaller beat transfer sizes by repeating the quad-word sized beats popped from FIFO 584. The read request memory includes counters and state variable registers tracking the requests current address, beat count and per RTAG bit mapped valid status. The RDATA pipe 578 also generates the last beat of burst status as part of the burst response and detects request completion. Upon request completion the valid bit indexed by the RTAG of the previously admitted request is cleared making that RTAG value once again available. Quad-word beats popped from FIFO 584 can be interlaced and intermingled with other requests. The ARC RID lookup in block 576 uses the RTAG requests popped with each beat from FIFO 584 to index the requests ARID to obtain each beat's RID. Parity checking of each beat is performed by parity check block 579 as data enters the RDATA pipeline 578. If the beat's parity enable flag from FIFO 584 was set, and the parity check fails, each beat delivered to FIFO 586 will be marked as having a parity error ("slverr") rather than with an "okay" response. Also, beats bogusly generated by generator 551 will bear this error response marking having been so tagged when pushed into FIFO 584. The RTAG vacancy check mechanism in block 576 provides flow control as FIFO 584 is sized large enough to accommodate sixteen complete responses, this being necessary as channel 422 cannot otherwise be flow-controlled once PLB read requests have been issued from PCC 540.

The PLB typically operates at a higher clock rate than the AXI bus. Clock rate adaptation is performed in the AXI Write Control (AWC) 502 and AXI Read Control (ARC) 570 blocks. Much of the clock rate adaptation is handled by the various FIFOs in these blocks. Thus, most of the logic in the bridge 306 operates at the PLB clock rates.

The PCC block 540 receives both read and write requests from RTAGC[0:N−1] FIFOs 580 and WTAGC[0:N−1] FIFOs 524, respectively. New read and write requests are popped from either the RTAGC[0:N−1] FIFOs 580 or the WTAGC[0:N−1] FIFOs 524 respectively under control of the read arbiter 705 or the write arbiter 605 as discussed above. The PCC arbiter 541, responsive to the read arbiter 705 and write arbiter 605, decides which, if any, request should be issued as a PLB request, and presents the request's tag to the request pipeline 542. The PCC pipeline 542 then issues requests to the PLB controller 404, and receives responses to those issued requests on the PLB Combined Response channel 428.

Similarly, indices for read and write splits (where an AXI request cannot be accomplished with a single PLB request) are popped from either the r_splits or w_splits per tag bit mapped registers (not shown) in PCC 540. Requests which have been previously issued, but that need to be retried, are popped from a retry FIFO (not shown) in PCC 540. Alternately, a null tag can be selected if no request should be issued.

The PCC 540 uses the indices selected by the arbiter 541 to retrieve the request information from either the Read or Write request memory 574, 504, respectively. The request including generated address and byte enable parity is written to the PCC request pipeline 542.

When the PLB request channel 414 is ready, the PCC 540 delivers the request request over channel 414 and advances the pipeline 542. The PLB allows the bridge 306 to issue up to two requests for which combined responses have not been provided. The bridge 306 complies with this requirement using an up down credit counter (not shown) that is initialized to the number of allowed outstanding PLB requests and which counts down when the bridge 306 issues a request and up when a combined response is received. The credit counter is located in PCC 540.

The indices for each issued request are pushed into the PCC 540's response FIFO (not shown). When the combined response is received, an entry from the response FIFO is popped. The entry popped from the response FIFO thus represents the read or write request to which the request's combined response applies. The read bit indicates whether the tag represents a read or a write.

Exemplary Read Operation of A2P Bridge 306

When a read request from the AXI bus 304 is received, the bridge 306 performs the following exemplary operations:

A. Read requests over the AXI Read Address (RADDR) channel 416 is buffered by a FIFO 572 and is loaded into the FIFO 572 if there is room to do so. If there is no room or, optionally, when the FIFO 572 is "almost full", the read request is not acknowledged by the ARC 570 to the requesting client via to the AXI bus 304.

B. The ARC 570 reads an entry from the AR FIFO 572 and compares its ARID to outstanding ARIDs in the RTAG memory 576. If there is no match, and a vacancy is available, a four bit RTAG index is assigned to the new request. In one embodiment, sixteen potential RTAG contexts each representing a complete AXI Read request can be accommodated. The Read Data FIFO Memory 584 is large enough to accommodate, in this embodiment, a maximum number of sixteen beats from PLB channel 422 for every read request's traffic burst.

C. The Read Request from the FIFO 572 is posted to the Read Request Memory 574. The request memory holds the ARID and other per RTAG context information (e.g., state variable and state counter information) associated with the AXI read request. This information is sent with the PLB read request and returned in the PLB combined response, and is used to associate PLB beats with AXI read requests and to use the RID lookup block 587 looking up RIDs and beat-by-beat context status from the RTAG-indexed read request memory 574.

D. The ARC 570 posts a read request to the appropriate one of the RTAGC[0:N−1] FIFOs 580 as determined by the value of the ARID explained in more detail below.

E. The PLB Request Control (PCC) 540 reads entries from the RTAGC[0:N−1] FIFOs 580 selected by, for example, a round-robin, prioritized, random, most full, or least recently read algorithm as desired.

F. The PCC 540 presents the read request to the PLB Bus controller 404 via channel 414.

G. The PCC 540 receives the combined response from the Bus controller 404.

H. The PCC 540 updates the read combined response logic 582 with any one of "rsv" (an error condition that infrequently occurs), "ack" (acknowledge and accept the request), "retry" (PLB arbiter 404 in FIG. 4) indicates the system is not ready to accept the request at this time, request is rejected and needs to be retried), or "err" (error, request is rejected, no data tenure will occur).

For the combined responses of "rsv" or "err", a per RTAG status register must be marked with a bad status corresponding to the offending RTAG index. Although no PLB data tenure will occur, an error-flagged response to the AXI Response channel 424 must be generated. This marked bad status is passed along with other bad request status information to the bogus beat generator 551.

For combined responses of retry, PCC 540 pushes the RTAG index onto its retry FIFO (not shown). For combined response of acknowledge, the PCC 540 must update its RTAG indexed split status to indicate whether subsequent PLB read requests need to be generated to satisfy this RTAG indexed request entry.

I. The PRC 550 receives the read data from the PLB via channel 422 after bit reordering in swapper 552.

J. The PRC 550 copies the read data to the read data FIFO 584.

K. The RTAG information is updated by logic (not shown) in read buffer 418 on each beat of the read data burst from the PLB channel 422.

L. The ARC 570 transfers data and RTAG indexes from the read data FIFO memory to pipeline 578 in ARC 570.

M. Parity is checked in the R Data Pipeline 578. The ARC 570 uses the RTAG as an index to look up the Read ID (RID), a bit-field in the channel 424, and the other information stored at the RTAG index to the Read Request Memory 574 and per RTAG context state variables to properly format the bursts for delivery into the ARC R FIFO 586. When the burst is completely delivered to the R FIFO 586, the associated RTAG is de-allocated from RTAG memory 576. The ARC delivers the read data from the R FIFO 586 onto the AXI RDATA channel 424 in the same order as it was received from the PLB 310. In this embodiment, the AXI read data bursts on channel 424 could be interleaved since AXI transactions can be split into multiple PLB transactions.

Exemplary Write Operation of A2P Bridge 306

When a write request from the AXI bus 304 is received, the bridge 306 performs the following exemplary operations:

1. Write requests from the AXI Write Address (AXI WADDR) channel 408 are received by the AXI Write Control block (AWC) 502 and the requests are stored the AW FIFO 514. The AXI interconnect fabric 402 is controlled by logic within the AWC 502 that accepts address and control information into the AW FIFO 514 over channel 408 whenever there is room in that FIFO. The AWREADY signal, one of several control signals from the AXI WDATA channel 406, is asserted when there is room in the FIFO, but de-asserted when the FIFO is Almost Full.

2. The AWID and vacancy check block 510 in the AWC 502 reads an entry from the AW FIFO 514 and compares its AWID to outstanding AWIDs in memory 504. As will be explained in more detail in connection with FIG. 8, if there is no match and a vacancy is available, a four bit WTAG index entry in the WTAG-indexed memory 504 is assigned, reserving memory space in the Write Request memory 504, Write Data memory 520, Write Strobe memory 522, and STAG registers 526. Write Data Memory 520 is allocated in blocks large enough to accommodate the maximum AXI write data burst of sixteen beats.

3. The AWC 502 writes the request to the Write Request Memory 504. This includes a list of the AWIDs and other information from the AXI write request. The AWC 502 keeps track of per WTAG context state variables in local registers in the AWC 502. Here, a context comprises an AXI request on bus 408, a PLB request on bus 414, PLB and AXI data transfers over their respective buses, associated responses, WTAGs, state variable registers, and how signals therein propagate through the various pipelines. A context commences with an AXI request and although the request terminates with an AXI response on channel 426, the context persists until completion of write data delivery on channel 412 and the AWC 502 is notified of the completion via bus 532. Thus, the write context may persist many clock cycles following the write request completion which terminates with the pushing of the BRESP to FIFO 512.

4. The AWC 502 receives Write data from the AXI Write Data (AXI WDATA) channel 406 and stores the data into the W FIFO 508. The Write Data (AXI WDATA) channel 406 is controlled by logic that accepts data into the FIFO 508 whenever there is room in the FIFO. The WREADY signal, a control signal included with the AXI WDATA channel 406, is asserted when there is room in the FIFO, but de-asserted when the FIFO is almost full.

5. The AWC 502 reads entries from the W FIFO 508 and compares the WID to the outstanding valid context AWIDs. If there is a match, the AWC uses that WID to lookup the beat's WTAG index. It then uses that WTAG index to access local state variable registers in the WID check block 506 for a merge operation. It posts the merged beat to the WB Write Data Memory 520 using the WTAG index and the WTAG indexed per context pointer register as the Write Data Memory Address.

6. When WLAST, a control signal originating from the AXI channel 406, has been popped from FIFO 508, the AWC 502 posts a WTAG entry from pipeline 509 to one of the WTAGC [0:N−1] FIFOs 524 determined by the value of the AWID (explained in more detail below), indicating that the last AXI beat on channel 406 has been received by FIFO 508.

7. The PCC 540 reads entries from the appropriate one of the WTAGC[0:N−1] FIFOs 524, based, for example on a round-robin, prioritized, random, most full, or least recently read technique, to retrieve a WTAG index to the AXI Request and Data Memory 504. From the perspective of the PCC 540, this is a newly ready and available request for which a PLB request is to be issued, and has not been previously issued, split, or retried.

8. The PCC 540 presents a write request to the PLB controller 404 via channel 414. When the combined response from controller 404 indicates an acknowledgement over channel 428, and the acknowledged request was a write request, an entry is pushed into the WTAG_D FIFO 528.

9. The PCC 540 receives a combined response from the Bus controller 404 via channel 428.

10. When the final combined response for the request's last PLB request is received over channel 428, the PCC 540 sends the write response status and WTAG index value to the B FIFO 512 in AWC 502 via bus 513. The write response status from PCC 540 is one of "rsv" (an error condition that infrequently occurs), "ack" (acknowledge and accept the request), "retry" (PLB arbiter 404 in FIG. 4) indicates the system is not ready to accept the request at this time, request is rejected and needs to be retried), or "err" (error, request is rejected, no data tenure will occur).

For the combined responses of "rsv" or "err", a per WTAG status register must be marked with a bad status corresponding to the offending WTAG index. Although no PLB data tenure will occur, an error-flagged response to the AXI Response channel 424 must be generated.

For combined responses of retry, PCC 540 pushes the WTAG index onto its retry FIFO (not shown). For combined response of acknowledge, the PCC 540 must update its WTAG indexed split status to indicate whether subsequent PLB write requests need to be generated to satisfy this WTAG-indexed request entry.

11. The BID lookup block 505 in AWC 502 uses the write response WTAG index (hereinafter "BTAG") to look up the BID, the AXI write response channel 426 identification number (ID) associated with the ID of the write request received over channel 408. The BTAG, is used to index the AWID from memory 504. The AWC 502 formats an AXI Write response, indicating that a write has been completed by the PLB controller 404, and stores it into the B FIFO 512.

12. AWC interface control logic (not shown) within AWC 502 delivers the AXI Write response from the B FIFO 512 to the AXI BRESP channel 426.

13. The PCC 540 updates the WB registers 526 with the PLB Slave Tag and PLB Slave ID for a valid combined response to the PLB request channel 414. It also enters the WTAG index into the WTAG_D FIFO 528. The slave tag is given to the bridge 306, as a PLB master, as part of the combined response on channel 428 to a write request. The slave tag originates in the slave (within PLB subsystem 310 in FIG. 4) targeted by the PLB master and is passed through the PLB Bus Controller 404 to the bridge 306. The bridge 306 provides the slave tag along with the data in the PLB write data transfer phase. This allows the target PLB slave to match the transferred data with the earlier request. The slave ID is given to the master as part of the combined response over channel 428 to a write request. This slave ID originates in the PLB controller 404. The bridge 306 provides this slave ID along with the data in the PLB write data phase, so that the PLB controller can route the write data to the correct target slave.

14. The PWC 530 reads the WTAG index from the WTAG_D FIFO 528, requests and is granted the PLB write data channel 412 and reads the Write Data Memory 520 and Write Strobe Memory 522 at the WTAG index for a beat-by-beat retrieval of stored and merged AXI Write Data in memory 520 and stored merged AXI Write Strobes and parity in memory 522. This information is, in the next step, transmitted to the PLB controller 404 over the PLB write data channel 412 after bit reordering in swapper 536.

15. The PWC 530 sends the burst to the PLB controller 404 over channel 412. When the PWC 530 completely delivers the last burst, it signals the AWC 502 via bus 532 to de-allocate the corresponding WTAG index in memory 504.

The PLB write data channel 412 includes control signals, write data, write data parity, slave ID (SID), and the slave tag (STAG). The SID and STAG accompany the write request's combined response acknowledge and are received from the combined response interface 414. The SID and STAG are stored to, and retrieved from, per context registers 526 in the WB 410. The SID is supplied with the PLB write data access request. The STAG is provided with each beat of data traffic sent over channel 412.

End of Examples

As described above, the above embodiment handles transactions from a source, such as the AXI bus, which uses a source ordering ID and satisfies each source transaction with one or more transactions on a destination, such as the PLB 310 (FIG. 4), which supports transaction retries. This embodiment allows a subset of the source ID bits (e.g., AWED) and the data being accessed by a transaction to be used to determine the order that destination transactions are issued. By not doing so, conflicting transactions from one or more AXI bus masters with the same AWID might cause overwriting of application-sensitive memory-mapped locations accessible through the PLB 310. However, stalling all transactions because of a duplicate AWID might cause unacceptable delay in processing requests. Instead, by assigning requests with the same AWID to the same FIFO, latency of requests might be reduced.

In another embodiment, it might be desirable that write request ordering is enforced using information, such as address (e.g. AWADDR) and straddle status (e.g. "Straddle" or S bit) stored in register arrays (not shown) in memory 504, other than the AXI ID. The WID and BID values are looked up using the appropriate WTAG index to the AWID array in memory 504.

Additionally, the master portion of the AXI ID, unique to the master, may be considered separately from the transaction portion of the AXI ID, particularly if multiple requests are coming from a single AXI bus master. It may also be advantageous to consider AXI read and write request address straddling of cache line boundaries (a set S bit) in the PLB when accepting or refusing a request.

As described herein and in this exemplary embodiment, the AWC 502 is able to take into consideration the candidate AXI request's beginning memory address (AXI address field), amount of data (from AXI Length and AXI Size fields) to determine if there is straddling of the 128 byte boundary requirement of the PLB, in addition to the AXI ID field, before a write tag (WTAG) is granted. Further, stored information derived from previously admitted AXI requests may also be taken into consideration as to where to direct the WTAG to the appropriate one of the WTAG FIFOs 524 depending on the AWID index, as well as the history of the progress (stored in progress counters in PHC 534) in processing those requests, e.g., the latency and number of retries (stored in retry counters (not shown) in PTC 560) of similar requests. A block diagram of an apparatus that provides the above-described functionality is shown in FIG. 8.

Figure 8:
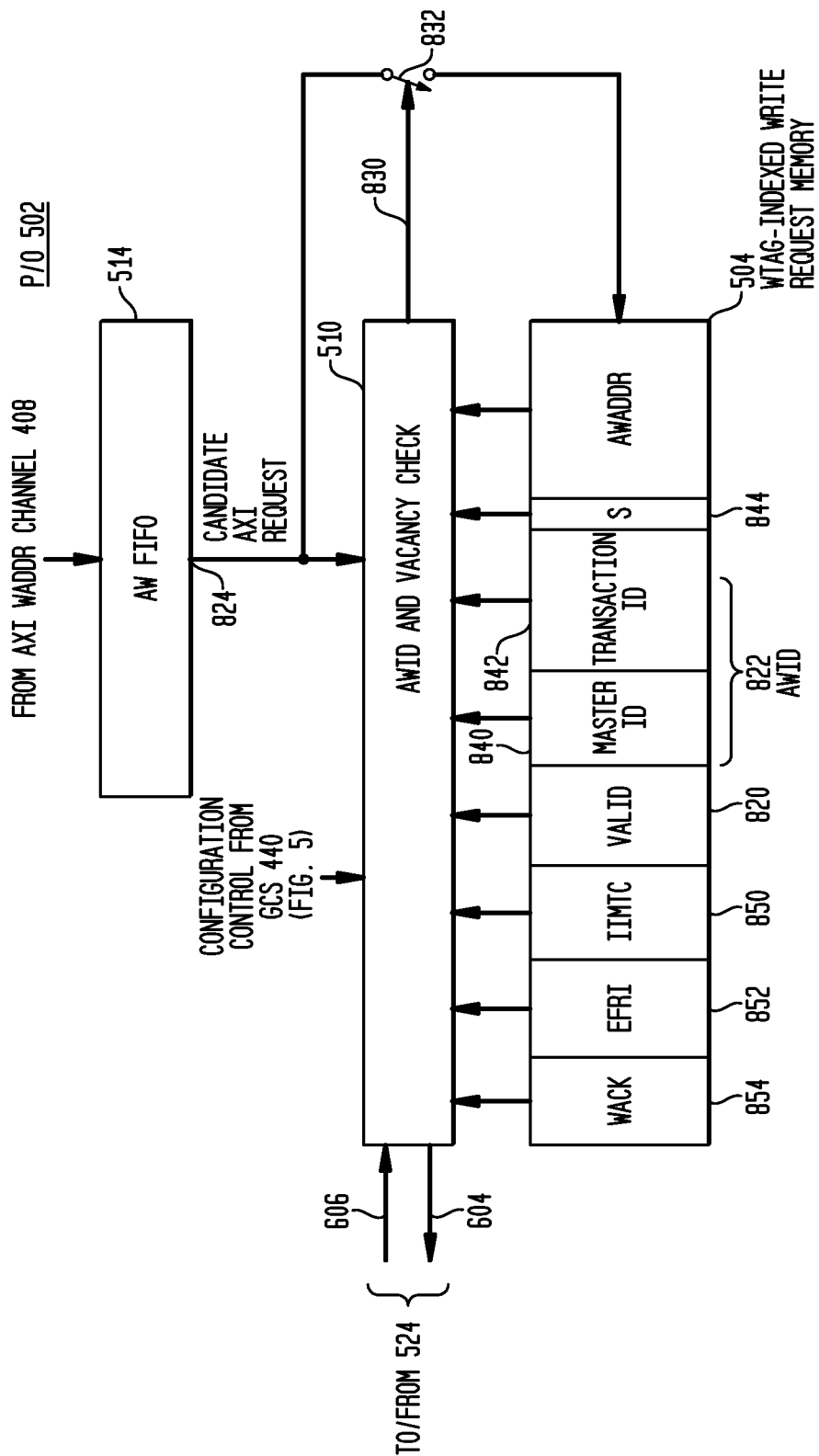
FIG. 8 shows a more detailed simplified block diagram of part of block 502 within the AXI-to-PLB bridge of FIG. 5, in accordance with embodiments of the present invention.

FIG. 8 shows a portion of the AWC 502 in FIG. 5. It desirable that the proper ordering of AXI write requests is verified before the write request are stored in the write request memory 504. For data coherency, write requests with the same AWID indices should be sent to the PLB controller 404 in the same order in which the requests were received and in the order in which the PLB write request sequences from PCC 540 are acknowledged from PLB controller 404. To do so, the AWC 502 preserves the ordering of writes by assigning new AXI write requests (AW) that have the same write request ID (AWID) to one of the WTAGC[0:N−1] FIFOs $600_0$-$600_{N-1}$ (FIG. 6) corresponding to the AWID. In one embodiment, there are sixteen possible AWIDs (four bits) and there are four FIFOs in WTAGC FIFOs 524: WTAGC0-WTAGC3 (FIG. 6). Additional or fewer FIFOs may be used in alternative embodiments. In this embodiment, block 510 is a state machine that matches the AWIDs of previously admitted requests stored in memory 504 to AWIDs from candidate write requests from channel 406 that are stored in FIFO 514 and interfaces with signals 604 and 606 in FIG. 6. As described below, the block 510 processes AXI write requests with the same (matched) AWIDs and places the WTAGs with matched AWIDs in the same FIFO so that AXI write requests with the same AXID are completed sequentially in the order presented to AWC 502.

As described above in connection with FIG. 5, the AWID block 510 obtains a write request from the AW FIFO 514 and compares the AWID of the request with AWIDs 822 in the WTAG-indexed memory 504. If no match occurs and there is room in the WTAG-indexed memory 504, the AWID of the request is entered into the WTAG-indexed memory 504 and a corresponding "Valid bit" 820 is set corresponding to the entered AWID. The AWID has both a master portion 840 and transaction portion 842. The master portion 840 identifies the particular AXI master issuing the request, and the transaction portion 842 identifies a particular transaction from that AXI master.

As configured by control bits from the GCS 440, the AWID and vacancy check block 510 matches AWID and/or write address AWADDR of pending write requests at output 824 of FIFO 514 to AWIDs and AWADDRs for pending write requests in memory 504. Should no match occur and there is room in memory 504 (when at least one of the Valid bits 820 is not set), then output 830 pops the candidate request from the FIFO 514 and loads the candidate write request into the memory 504, symbolized by the closing of switch 832. Alternatively, the block 510 may be configured to match just the master portion 840 of the AWID 822.

Completion of a pending request's context is indicated by the corresponding Valid bit 820 at the WTAG position in the bit-mapped memory 540 not being set. Completion of requests is simultaneous with the pushing of an entry into B FIFO 512. However, the clearing of WTAG-indexed Valid bits 820 does not occur until delivery of write data to the PLB is completed.

Write requests that straddle 128-byte boundaries have a "Straddle" bit (S) 844 set. If a write request that straddles a 128-byte boundary is admitted (after all requests with the matching master ID have been satisfied and their WTAG released), the corresponding S bit 844 is set and any subsequent request with the same Master portion 840 of the AWID 822 will be blocked because the corresponding S bit entry is set for the entry that matches that master ID. Here, the straddle check is implemented in hardware (block 510). If the value of an AXI request's width adjusted AWLEN (part of the AXI request sent over channel 408) is greater than the complement of the quad-word addressing portion of that same AXI request, AXADDR, then a straddle condition is declared. For example, should an AXI subsystem master in the AXI bus subsystem 304 (FIG. 4) vary the non-master portion of an AXI AWID it generates, write ordering is still desirable. If the master portion of the AXI AWID for the AXI master is specified, and there was an additional requirement that the configured master portion of the AXI AWID also be matched, other "non-offending" AXI subsystem AXI masters might be spared the performance penalty of unnecessarily blocked requests.

The Write Request Memory 504 has three additional fields, an Initial ID Match (IIMTC) field 850, an Empty Flow Reservation Index (EFRI) 852, and a WACK flag 854 that indicates if a WACK from the PLB6 bus has been received in response to the corresponding AXI write request (AW). There are IIMTC, EFRI, and WTAG flag entries 850-854 associated with each write request entry in the Write Request Memory 504. As described in connection with FIGS. 10 and 11, these entries provide for non-blocking of disparate AWID matching groups.

The IIMTC field 850 is multi-bit field, each bit in each IIMTC field corresponding to each possible WTAG value. For example, if a WTAG can take a value between 0 and 15, then IIMTC field has at least sixteen bits. Individual bits in all of the IIMTC fields can be simultaneously cleared. This field helps enforce ordering of write requests with the same AWID and/or matching write address AWADDR (if enabled by setting the appropriate flag in GCS 440) or the S bit being set (if enabled by setting the appropriate flag in GCS 440) of pending write requests. The EFRI field 852 is a multi-bit field indicating which one of the N WTAGC[0:N−1] FIFOs $600_0$-$600_{N-1}$ (FIG. 6) a task is to be assigned. For example, if there are four FIFOs (N=4), then the EFRI field is at least two bits. This field keeps track of which FIFO $600_0$-$600_{N-1}$ conflicting write requests (having an AWID matching the pending request) are queued for execution. Because there may be fewer FIFOs $600_0$-$600_{N-1}$ than there are possible AWIDs (e.g., there are fewer FIFOs $600_0$-$600_{N-1}$ than there are write request entries in memory 504), the FIFOs $600_0$-$600_{N-1}$ are referred to herein as flow FIFOs since multiple write requests might be assigned to one of the FIFOs $600_0$-$600_{N-1}$.

Figure 9:
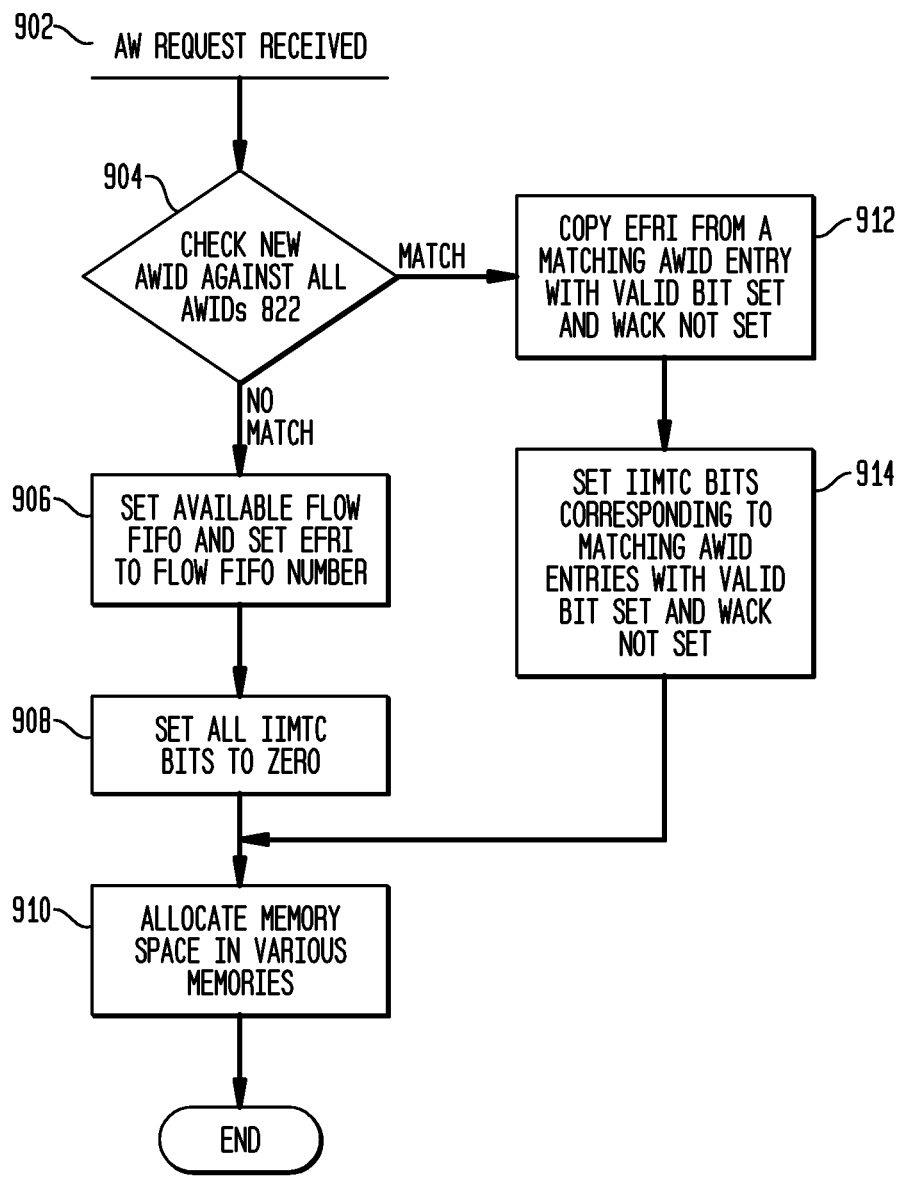
FIG. 9 is a simplified flow chart illustrating a method setting certain fields in a memory shown in FIG. 8, in accordance with embodiments of the present invention.
Figure 10:
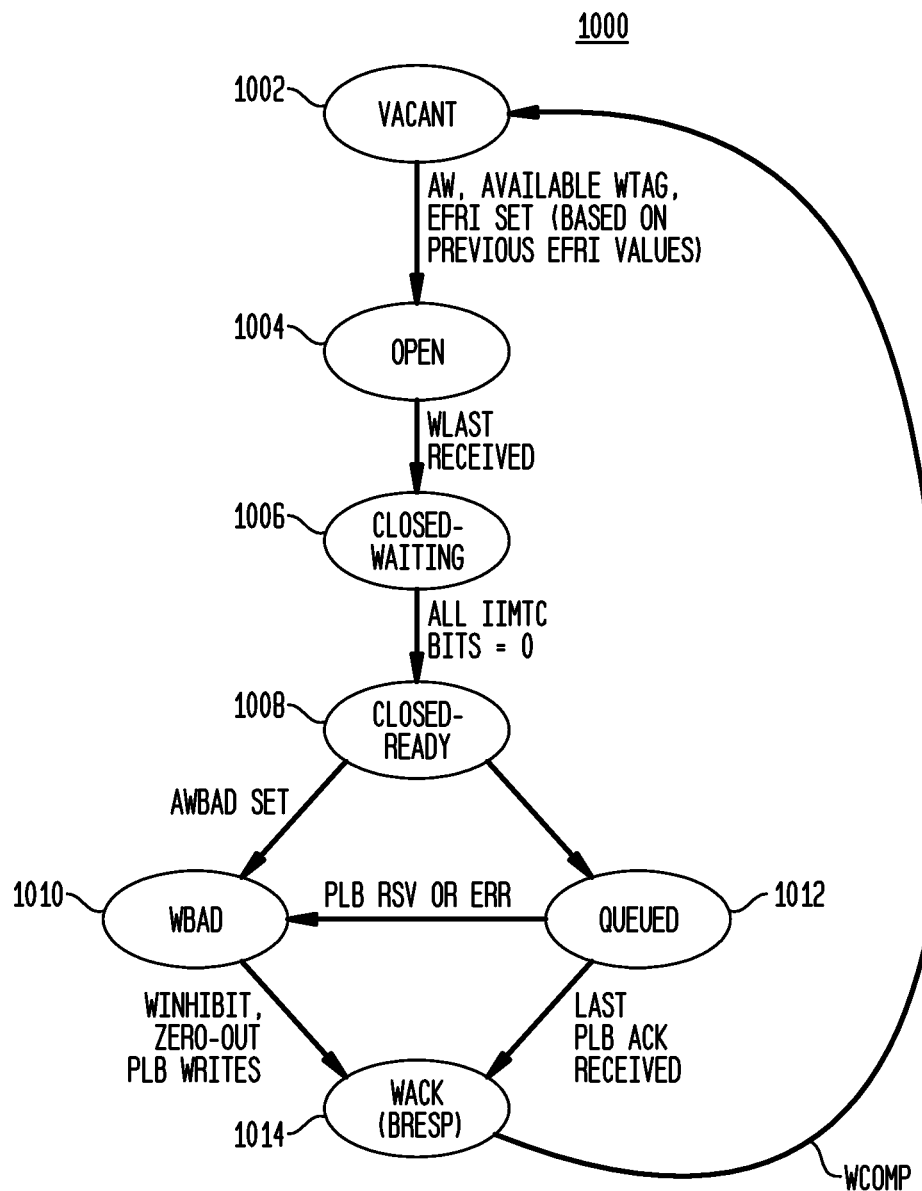
FIG. 10 is a simplified per-context flow diagram of initializing and operation of the block of FIG. 8 for write requests in accordance with embodiments of the present invention.

Operation of the AWID and vacancy check block 510 in conjunction with the IIMTC and EFRI fields and the WACK flag may be understood from a simplified flowchart in FIG. 9 and a simplified per-context state diagram shown in FIG. 10. In one embodiment as shown in FIG. 9, a process 900 for setting the EFRI and IIMTC fields in response to a received AWI write request is illustrated. As described above, an AXI write request (AW) is received in step 902 and the AWID of the request is checked against other AWIDs in memory 504 with a corresponding set Valid bit 820 and clear WACK bit 854 in step 904. If no match occurs, then in step 906 one of the flow FIFOs $600_0$-$600_{N-1}$ is selected to receive the WTAG associated with the received write request and that flow FIFO's number (e.g., 2) is stored in the corresponding EFRI field of the received write request. Then in step 908 all of the IIMTC bits corresponding to the write request in memory 504 are set to zero (cleared). Which flow FIFO the WTAG is assigned in step 906 may be done on a random, least recently used, most empty, or sequential basis. Alternatively, the flow FIFO assigned may be done on a priority basis where certain write (or read) requests have a higher priority than other requests when the arbiter 605 in FIG. 6 (or 705 in FIG. 7 for read requests) transmits WTAGs from one or more of the flow FIFOs in preference to WTAGs in other flow FIFOs to the arbiter 541 (FIG. 5) for execution. After step 908, in step 910 memory space in the Write Request memory 504, Write Data memory 520, Write Strobe memory 522, and STAG registers 526 (FIG. 5) is reserved. Write Data Memory 520 is allocated in blocks large enough to accommodate the maximum AXI write data burst of sixteen beats.

If a match occurred in step 904, then in step 912 the EFRI value from the AWID entry in memory 504 with a set Valid bit and a cleared WACK flag is copied to the EFRI field of the corresponding write request in memory 504. Then in step 914 the bits corresponding to the matching AWID entries having a set Valid bit and a cleared WACK flag in memory 504 are set and control passes to step 910 as described above. Steps 912 and 914 allow for the queuing of write requests with matching AWIDs to be buffered in the memory 504 before they are loaded (queued) in the flow FIFO specified by the copied EFRI field. An exemplary per-context operation of the bridge 306 will be discussed below in connection with FIG. 10. Setting of the per-context or per-request WACK flag indicates that the last PLB write request completing the requested write transaction has been acknowledged by the PLB, thus ensuring the subsequent ordered delivery of its corresponding write data. Contexts thus marked are waiting for the delivery of the context's write data to the PLB. Termination of the context is scheduled and occurs immediately subsequent to the corresponding PLB Write Complete (WCOMP) signal assertion and is terminated by the clearing of that context's Valid flag.

The foregoing discussion regarding candidate write requests processed by block 510 is also applicable to read requests received over channel 416 from the AXI subsystem bridge 306 for processing by ARC 570. While not described in further detail herein, it is understood that the and vacancy check block 576 functions substantially the same as the AWID and vacancy block 510, for candidate read requests in AR FIFO 572 prior to writing into buffer read request memory 574. Similarly, there are multiple read request RTAG FIFOs, RTAGC[0:N−1] FIFOs $700_0$-$700_{N-1}$ (FIG. 7), each corresponding to a possible value of the ARID from block 510. While the number of RTAG FIFOs (N) is shown as the same as the number of WTAG FIFOs, the number of RTAG FIFOs and the number of WTAG FIFOs can different. Alternatively, additional or fewer FIFOs may be used.

Exemplary operation of AXI write requests for one embodiment of the invention may be understood in reference to FIG. 10, a simplified per-context flow diagram. This diagram illustrates the operation of the bridge 306 for each candidate AXI write request received. The per-context or per-write request process 1000 illustrates the processing of an AXI write request as it progresses from AW FIFO 514 (FIG. 8) and processed by AWID and vacancy check block 510, passes through the assigned WTAGC[0:N−1] FIFOs $600_0$-$600_{N-1}$, and executed by PCC 540.

In the per-context diagram process 1000, the VACANT context state 1002 indicates an entry in the memory 504 that is currently not allocated to an AXI write request. A transition to the OPEN state 1004 is in accordance with the flowchart shown in FIG. 9 and as described above.

As described above, the IIMTC and EFRI fields for each request in the Write Request Memory 504 provide for non-blocking of disparate ID matching groups allow WTAG allocation conditioned upon there being no write requests with matching Master AWIDs, matching AWADDR (when enabled in GCS 440), or a set S bit (when enabled in GCS 440) that have context state information reflecting an OPEN status. Completion of a candidate request's context is indicated by the corresponding Valid bit 820 at the WTAG position in the bit-mapped memory 540 being cleared. Completion of requests is simultaneous with the pushing of an entry into B FIFO 512 (FIG. 5). However, the clearing of WTAG-indexed Valid bits 820 does not occur until delivery of write data to the PLB is complete in state 1002 described below.

A transition from OPEN state 1004 to CLOSED-WAITING state 1006 occurs when a WLAST, a control signal originating from the AXI channel 406, is popped from FIFO 508 and the AWC 502 pushes an entry from pipeline 509 to one of the WTAGC[0:N−1] FIFOs $600_0$-$600_{N-1}$ indicating that the last AXI beat on channel 406 has been received by FIFO 508 and represents write requests with a IIMTC status is that is not yet zero.

Going from the CLOSED-WAITING state 1006 to CLOSED-READY state 1008 occurs when all the bits in the IIMTC field for the candidate write request goes to all zeros. Because each IIMTC bit corresponds to conflicting requests with matching AWIDs, each IIMTC field tracks matching write requests that are pending but have not yet progressed to the WACK (BRESP) state 1014. The IIMTC bits are cleared coincident as the corresponding conflicting requests transition to the WACK state 1014 and the occurrence of the conflicting request's BRESP event. Once all the previously entered conflicting write requests reach the state 1014, all the IIMTC bits for the conflicted pending request are cleared and state 1008 is entered for that request.

If the PCC 540 determines that a particular write request is unacceptable (e.g., the request overwrites protected or non-existent memory), a bit corresponding to each request in a register AWBAD (not shown) is set and an error-marked Write Response BRESP is sent on bus 426 by pushing a so marked entry to the B FIFO 512. Upon the setting of the AWBAD bit corresponding to the unacceptable write request, the WBAD state 1010 is entered. In state 1010, the PLB writes are inhibited and state 1014 entered. If, instead, no such AWBAD is issued, then QUEUED state 1012 is entered in which the pending write request WTAG is entered or queued in the flow FIFO specified by the pending write request's EFRI. While in the QUEUED state 1012, the PCC 540 processes the pending request and remains in this state until a final acknowledgement for the PLB write request being executed is received via PLB bus 428 (FIG. 5) and WACK state 1014 is entered. Then the BRESP is pushed onto FIFO 512, terminating the write request, and the WACK flag in memory 504 corresponding to the pending write request is cleared. Then the Valid bit 820 corresponding to completed write request in memory 504 is cleared and the VACANT state 1002 is entered and the entry in memory 504 is freed for the next write request. However, if the PCC 540 instead of receiving a write acknowledge it receives a write response over bus 428 with "rsv" or "err" during execution of the write request in state 1012, then state 1010 is entered, continuing as described above.

Figure 11:
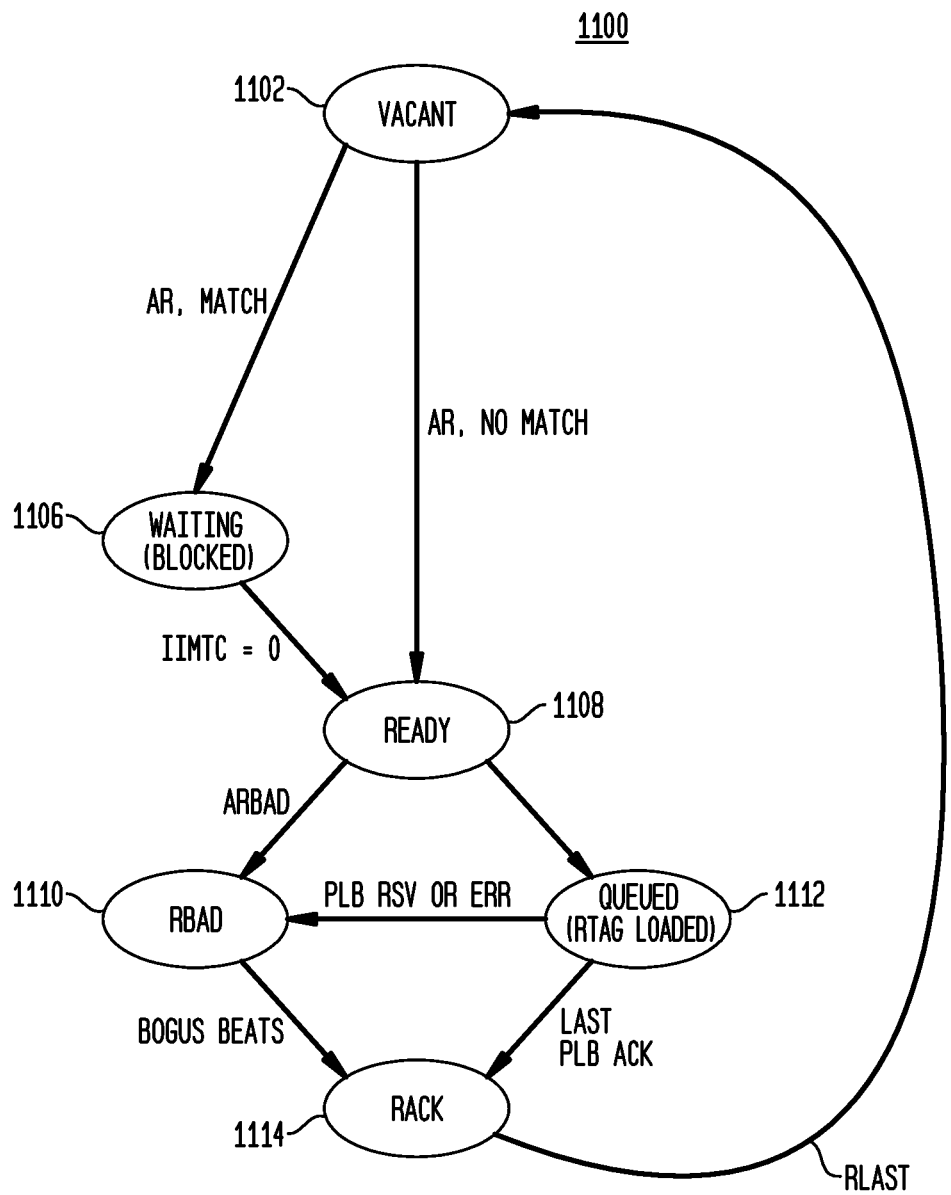
FIG. 11 is a simplified per-context flow diagram of initializing and operation of the block of FIG. 8 for read requests in accordance with embodiments of the present invention.

Exemplary operation of AXI read requests for one embodiment of the invention may be understood in reference to FIG. 11, a simplified per-context flow diagram. This per-context flow diagram is similar to the diagram in FIG. 10 and utilizes a similar process as that in FIG. 9 to set IIMTC and EFRI fields (not shown) in the ARID and vacancy check block 576. The diagram in FIG. 11 illustrates the operation of the bridge 306 for each AXI read request received. The per-context or per-read request process 1100 illustrates the processing of an AXI read request as it progresses from AR FIFO 572 (FIG. 5) and processed by ARID and vacancy check block 576, passes through the assigned RTAGC[0:N−1] FIFOs $700_0$-$700_{N-1}$, and executed by PCC 540.

Figure 12:
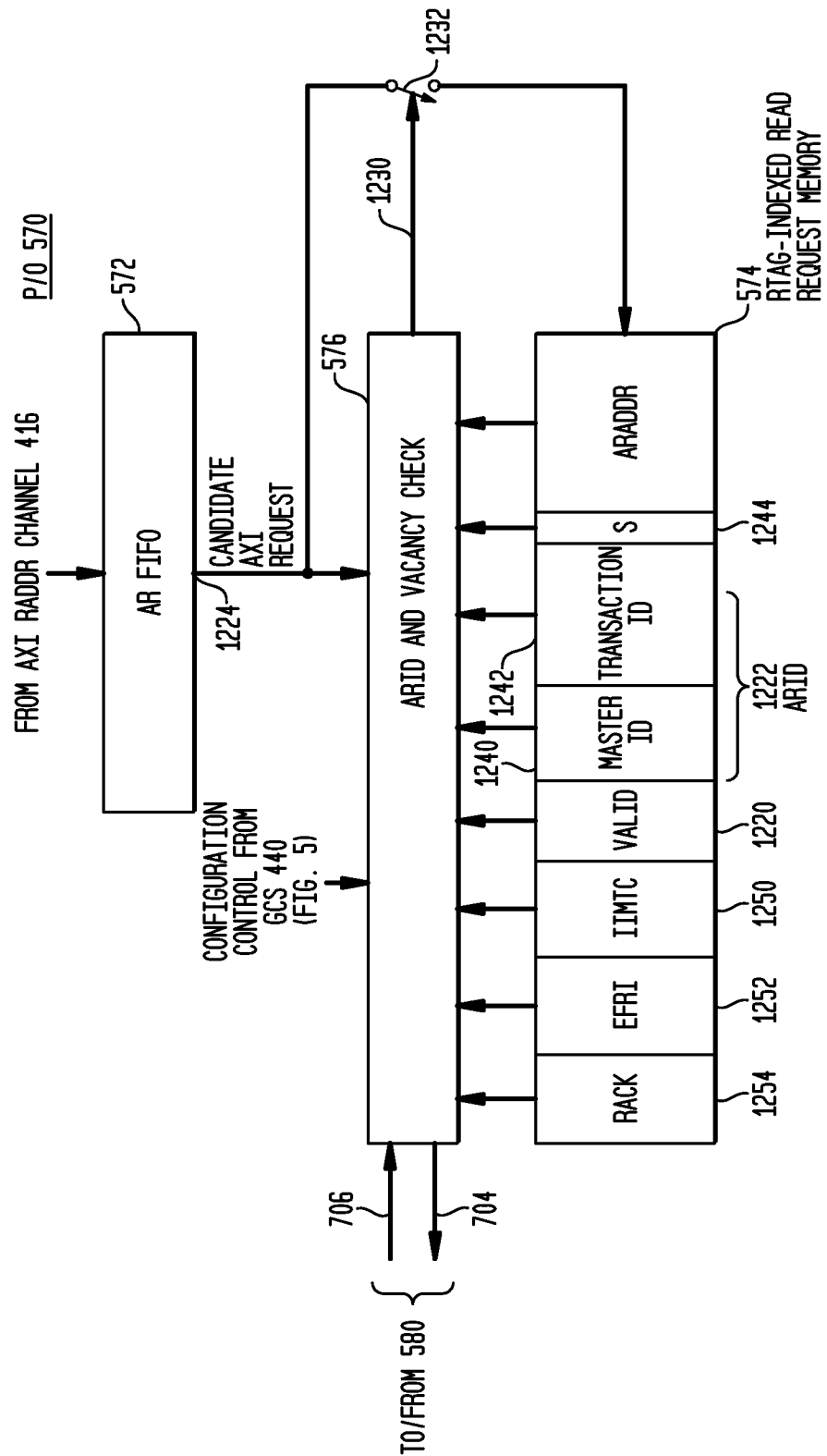
FIG. 12 shows a more detailed simplified block diagram of part of block 570 within the AXI-to-PLB bridge of FIG. 5, in accordance with embodiments of the present invention.

Turning temporarily to FIG. 12, FIG. 12 shows a portion of the ARC 570 in FIG. 5. The fields in the Read Request Memory 574 correspond to the fields in the Write Request Memory 504 shown in FIG. 8. Numbered elements in FIG. 12 correspond to like-numbered elements in FIG. 8. For example, a RACK flag 1254, an EFRI field 1252, an IIMTC field 1250, a Valid bit 1220, a Master ID 1240 and a Transaction ID 1242 (forming ARID 1222), an S bit 1244, and an AWADDR field, correspond to the WACK flag 854, the EFRI field 852, the IIMTC field 850, the Valid bit 820, the Master ID 840 and the Transaction ID 842 (forming the AWID 822), the S bit 844, and the AWADDR field, respectively, in FIG. 8 and have similar purpose. For purposes here, the block 576 corresponds to, and is functionally similar to, block 510 in FIG. 8 and as described above in connection with FIGS. 8 and 9 except that read requests are processed instead of write requests.

Returning to FIG. 11 and in the per-context diagram process 1100, the VACANT context state 1102 indicates an entry exists in a Read Request Memory 574 in the ARC 570 that is currently not allocated to an AXI read request. A transition from the VACANT state 1102 to either the WAITING state 1106 or the READY state 1108 is in accordance with the flowchart shown in FIG. 9 and as described above. If the there is no match between a candidate read request ARID and ARIDs 1222 in the Read Request Memory 574, then state 1108 is entered. However, if there is a match, then the candidate read request is blocked and entry of the request is delayed until all the bits in the IIMTC field 1250 for the pending read request are cleared (all zeros).

Going from the WAITING state 1106 to READY state 1108 occurs when all the bits in the IIMTC field 1250 for the candidate read request goes to all zeros. Because each IIMTC bit corresponds to a conflicting requests with matching ARIDs, each IIMTC field tracks matching read requests that are pending but have not yet progressed to the RACK state 1114. The IIMTC bits are cleared coincident as the corresponding conflicting requests transition to the RACK state 1114. Once all the previously entered conflicting write requests reach the state 1114, all the IIMTC bits for the conflicted pending request are cleared and state 1108 is entered for that request.

If the PCC 540 determines that a particular read request is unacceptable (e.g., the request attempts to read non-existent memory), a bit corresponding to each request in a register ARBAD (not shown) is set and an error-marked Read Response RRESP is sent on bus 424 by pushing a so marked beat entry to the R FIFO 586. Upon the setting of the ARBAD bit corresponding to the unacceptable write request, the RBAD state 1210 is entered. In state 1110, the PLB generates bogus read beats and state 1114 entered. If, instead, no such ARBAD is issued, then QUEUED state 1112 is entered in which the pending read request RTAG is entered or queued in the flow FIFO specified by the pending read request's EFRI field 1252. While in the QUEUED state 1112, the PCC 540 processes the pending request and remains in this state until a final acknowledgement for the PLB read request being executed is received via PLB bus 428 (FIG. 5) and RACK state 1114 is entered. Then the PLB read request is completed and the RACK flag 1254 corresponding to the pending read request is set. The Valid bit 1220 corresponding to completed read request is not cleared until the last beat is received from the PLB and the last RLAST is pushed entered into R FIFO 428 whereupon the VACANT state 1102 is entered and the entry in the Read Request Memory 574 is freed for the next read request. However, if the PCC 540 receives the combined response logic 582 with "rsv" or "err" response during execution of the read request in state 1112, state 1110 is entered, continuing as described above.

In an alternative embodiment, the IIMTC field is eliminated from either memory 504 and 574 if each of the WTAGC and RTAGC FIFOs are deep enough to hold multiple (e.g., four or more) WTAGs or RTAGs, respectively. With deep FIFOs, ordering of the read and write requests are enforced by the inherent functionality (first-in-first-out) of the FIFOs instead of by using the IIMTC field. If a FIFO specified by the request's EFRI field is full and, thus, unable to accept a tag, the request is held or blocked by the corresponding ID and vacancy block until the EFRI-specified FIFO is no longer empty, It is understood that one or more of the states described in connection with FIGS. 10 and 11 may be skipped or not implemented, and other states added, as desired.

While AXI and PLB buses are used in the above-described embodiment, it is understood that the bridge 306 may interface other bus types with similar characteristics to the AXI and PLB buses. For example, one of the primary characteristics of the AXI bus is that reads and writes are separate and ordering requirements are normally defined by the ID bits. The primary characteristics of PLB, relative to AXI, are the retry mechanism and the difference in data alignment and size of memory access requests.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bit stream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

The invention claimed is:

1. In a bridge coupling between a first bus and a second bus, a method for communicating between the first and second buses comprising:
    A) receiving from the first bus a candidate request having an identification field, the identification field having a value;
    B) selecting one of a plurality of buffers based on the identification field value;
    C) entering the candidate request into the selected buffer;
    D) reading a request from a specified one of the buffers;
    E) transmitting the read request over the second bus;
    F) receiving a response to the transmitted request from the second bus;
    G) transmitting the received response over the first bus; and
    H) removing the read request from the specified one of the buffers;
    wherein the first bus is an AXI-compatible bus and the second bus is a PLB-compatible bus.

2. The method of claim 1 wherein the candidate request is entered in step C) unless the selected buffer is full.

3. The method of claim 1 wherein the buffers are FIFO buffers.

4. The method of claim 1 wherein step B) comprises the step of:
    B1) selecting, from the plurality of buffers, a buffer having a request therein with an identification field value that matches the identification field value of the candidate request; and
    wherein step C) comprises the steps of:
    C1) entering, if a buffer was selected in step B1), the candidate request into the selected buffer; and
    C2) entering, if no buffer was selected in step B1), the candidate request into one of the buffers having no requests therein or into one of the buffers having at least one request therein with an identification field value not matching the identification field value of the candidate request.

5. The method of claim 4 wherein the candidate request and one or more requests in the buffers each have an address field having a value, and the buffer selected in step B1) has a request therein with an identification field value and an address field value that matches the identification field value and the address field value of the candidate request, otherwise the candidate request is written to one of the buffers in step C2).

6. The method of claim 4 wherein the candidate request has a flag that is set if execution of the request by a subsystem coupled to the second bus will require crossing of an address boundary in the subsystem, and the buffer selected in step B1) has a request therein with an identification field value that matches identification field value of the candidate request with the flag set, otherwise the candidate request is written to another one of the buffers in step C2).

7. The method of claim 4 wherein each request stored in the buffers has an associated flow index that identifies which one of the plurality of buffers contains the buffered request, and in step B1) the buffer is selected using the flow index of a request that has an identification field value that matches the identification field value of the candidate request.

8. The method of claim 7 wherein each buffered request has an associated initial identification match field that indicates the order in which the requests in a buffer were entered in step C).

9. The method of claim 8 wherein, in step D), the order in which requests are read from the specified buffer is based on the initial identification match field of each of the requests in the specified buffer.

10. The method of claim 9 wherein the initial identification match field is a multi-bit field, each bit corresponding to a request in a buffer having matching identification field values.

11. The method of claim 10 further comprising, after step H), the step of clearing the initial identification match field bit associated with the request removed from the specified one of the buffers in step H) for all requests in that buffer having matching identification field values.

12. The method of claim 1 wherein if more than one buffer has a buffered request, which buffer specified in step D) is based at least in part on a criteria selected from the group consisting of a) which buffer was least recently read, b) a sequential buffer order, c) a random buffer order, d) a most full buffer order, and e) a preferential buffer order.

13. The method of claim 1 wherein a buffered request is a buffered write request, the received response is a write request response, and the method further comprises the steps of:
    reserving space in a data buffer in response to the buffered write request;
    receiving, from the first bus, write data corresponding to the buffered write request;
    storing the received write data in the reserved space in the data buffer; and
    transmitting, in response to the write request response received in step F), the stored write data over the second bus.

14. The method of claim 13 wherein the second bus further comprises a write data channel, the write data channel for communicating the stored write data transmitted from the bridge.

15. The method of claim 13 wherein a error message is transmitted over the first bus in step G) if the write response received in step F) is an error response.

16. The method of claim 1 wherein a buffered request is a buffered read request, the response is a read request response, and the method further comprises the steps of:
    I) receiving data from the second bus in conjunction with the read request response received in step F); and
    J) storing the received data in a FIFO buffer;
    wherein in step G) the received data in the FIFO buffer is transmitted over the first bus.

17. The method of claim 16 wherein the second bus further comprises a read data channel for communicating the data to be received by the bridge.

18. The method of claim 16 wherein the identification field value of the buffered read request is transmitted along with the received data in step G).

19. The method of claim 16 wherein bogus data is substituted for the received data in step I) if the read request response received in step F) is an error response.

20. In a bridge coupling between a first bus and a second bus, a method for communicating between the first and second buses comprising:
   A) receiving from the first bus a candidate request having an identification field, the identification field having a value;
   B) matching the identification field value of the candidate request to an identification field value of at least one request buffered in a plurality of FIFO buffers;
   C) entering the candidate request into the FIFO buffer having at least one request therein with an identification field value that matches the identification field value of the candidate request;
   D) entering, if the candidate request was not entered in step C), the candidate request into one of the FIFO buffers having no requests therein or into one of the buffers having at least one request therein with an identification field value that does not match the identification field value of the candidate request;
   E) reading a buffered request from a specified one of the FIFO buffers;
   F) transmitting the read buffered request over the second bus;
   G) receiving a response to the transmitted request from the second bus;
   H) transmitting the received response over the first bus; and
   I) removing the request read from the selected one of the FIFO buffers;
   wherein each buffered request has an associated flow index that identifies which one of the FIFO buffers contains the buffered request, and in step C) the candidate request is entered into the one of the FIFO buffers specified by the flow index of one of the buffered requests that has an identification field value that was matched in step B).

21. The method of claim 20 wherein the candidate request is entered unless the selected buffer is full.

22. The method of claim 21 wherein each buffered request has an associated initial identification match field that indicates the order in which requests in a buffer were entered in step D).

23. The method of claim 22 wherein, in step E), the order in which buffered requests are read from the specified FIFO buffer is based on the initial identification match field of each of the buffered requests in the specified buffer.

24. The method of claim 20 wherein if more than one FIFO buffer has a buffered request, the buffer specified in step E) is based at least in part on a criteria selected from the group consisting of a) which buffer was least recently read, b) a sequential buffer order, c) a random buffer order, d) a most full buffer order, and e) a preferential buffer order.

25. A bridge for communicating between a first bus and a second bus, comprising:
   a receiver, coupled to the first bus, adapted to receive candidate requests, each candidate request having an associated identification field, the associated identification field having a value;
   a memory, coupled to the receiver, for storing requests, each request having an associated identification field, and each identification field having a value;
   a plurality of buffers, coupled to the memory, for buffering requests corresponding to those stored in the memory;
   a controller coupled to the memory and the plurality of buffers;
   a transmitter, coupled to the plurality of buffers and the second bus, adapted to transmit a request from a specified one of the buffers for execution by a subsystem coupled to the second bus;
   wherein the controller is adapted to:
      A) match the identification field value of the candidate request to identification field values of requests stored in the memory;
      B) enter the candidate request into the memory and into a) the buffer having at least one buffered request therein with a corresponding identification field value stored in the memory that matches that of the candidate request, b) one of the buffers having no buffered requests therein, or c) one of the buffers having at least one buffered request therein with a corresponding identification field value stored in the memory that does not match the identification field value of the candidate request; and
      C) remove the request from the memory and from the specified buffer after the buffered request is executed by the subsystems;
   wherein each stored request has an associated initial identification match field stored in the memory, the initial identification match field indicating the order in which candidate requests are entered into a buffer in step B).

26. The bridge recited in claim 25 wherein each stored request has an associated flow index stored in the memory that identifies which one of the plurality of buffers contains the buffered request, and the processor is further adapted in step B) to enter the candidate request into the buffer specified by the flow index of one of the stored requests that has an identification field value that was matched in step A).

27. The bridge recited in claim 26 wherein the buffers are FIFO buffers.

28. The bridge recited in claim 26 further comprising:
   an arbiter, coupled to the plurality of buffers and the transmitter, adapted to specify which one of the buffers is to provide the transmitter a buffered request for transmission, wherein which buffer the arbiter specifies is based at least in part on a criteria selected from the group consisting of a) which buffer was least recently read, b) a sequential buffer order, c) a random buffer order, d) a most full buffer order, and e) a preferential buffer order.

29. The bridge recited in claim 28 wherein each of the buffers has an empty flag coupled to the controller and to the arbiter.

30. The bridge recited in claim 25 wherein each buffered request is a tag and the memory is indexed by a tag.

* * * * *